Figure 29:
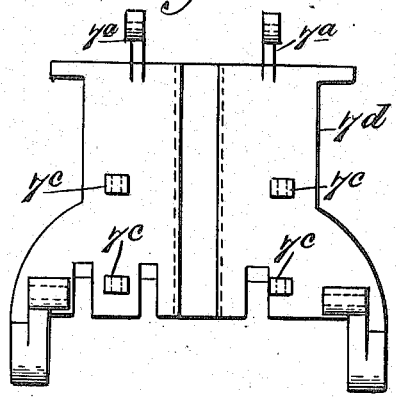

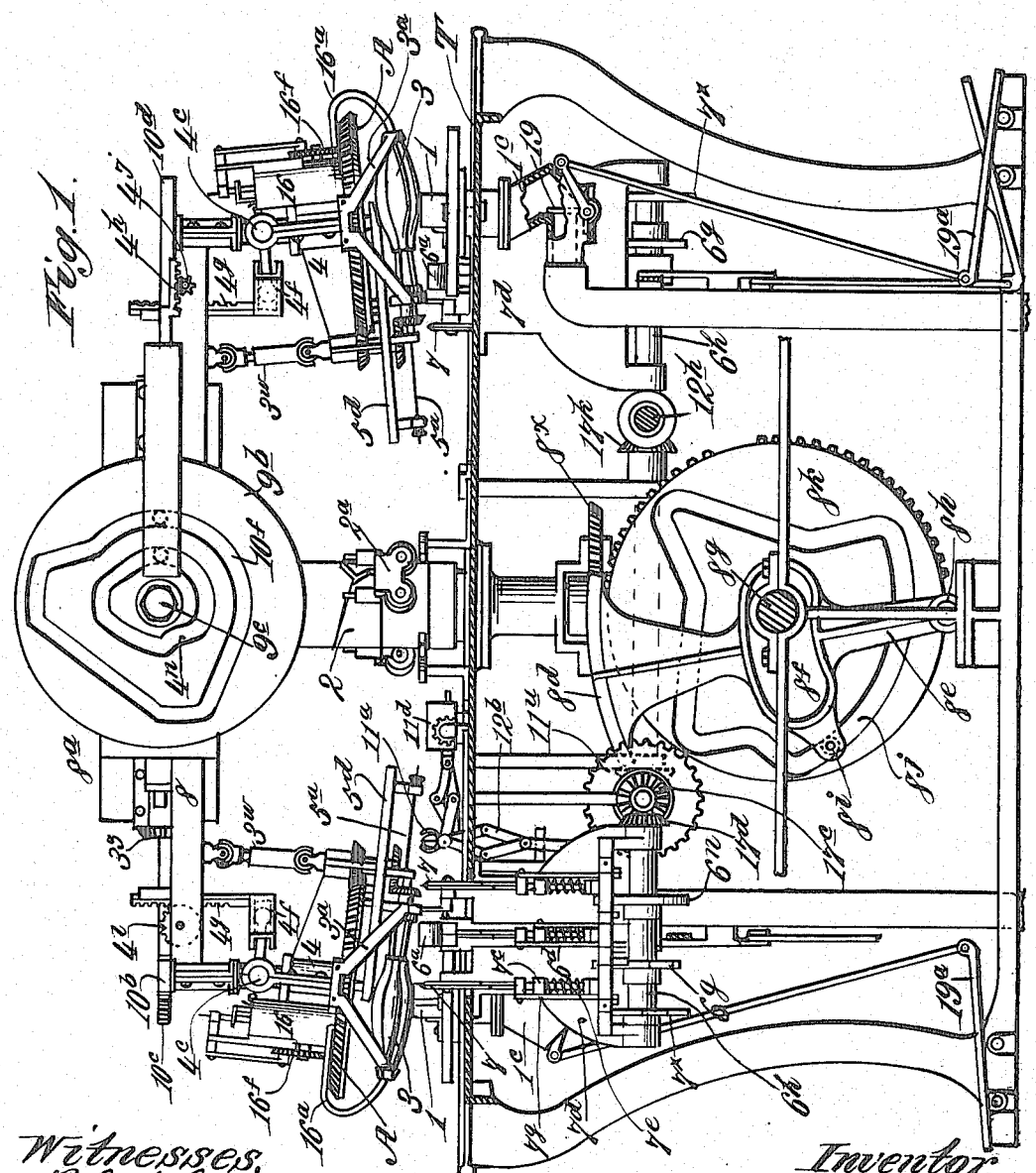

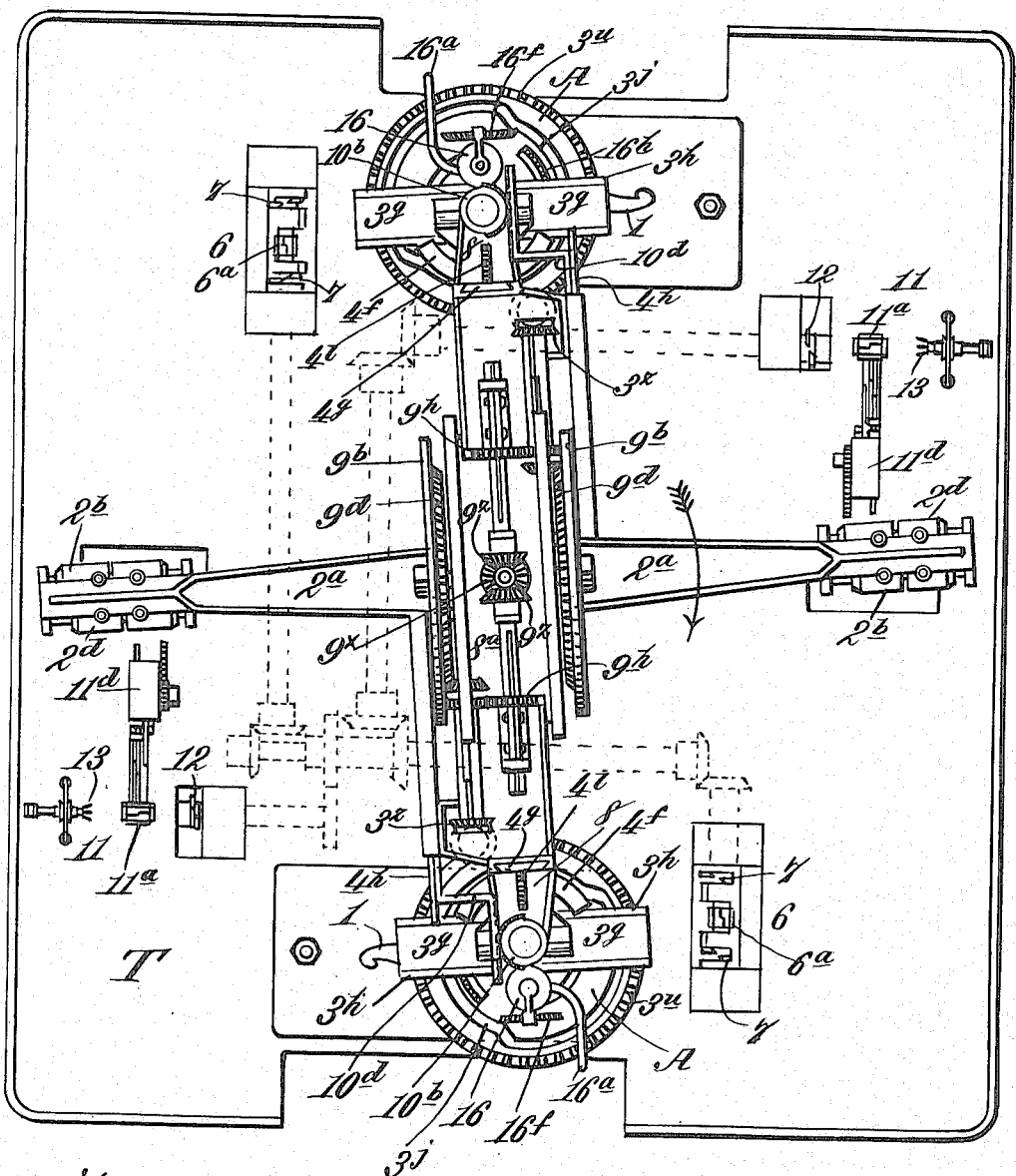

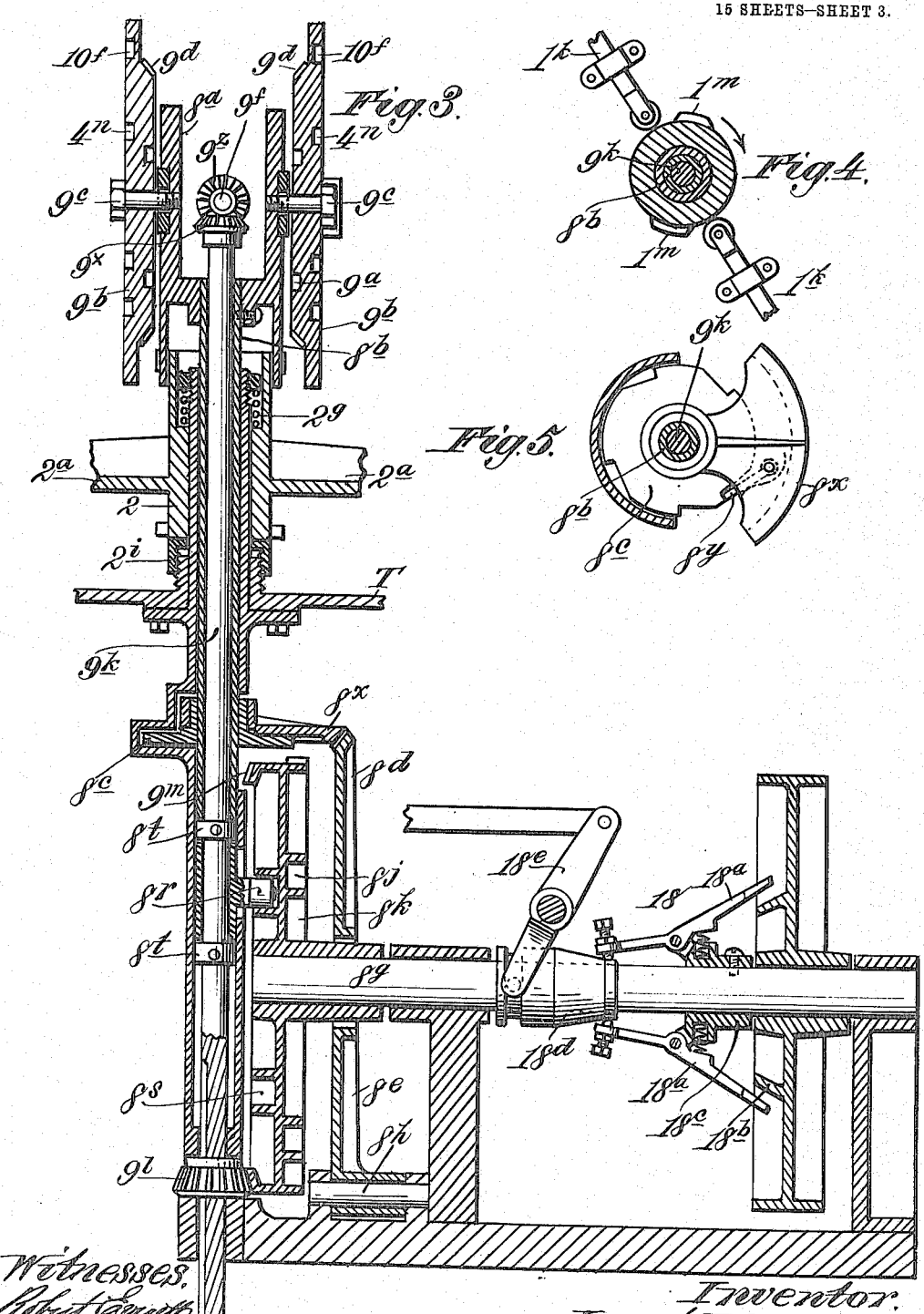
J. D. LACROIX.
MEANS FOR APPLYING WRAPPERS TO BUNCHES IN THE MANUFACTURE OF CIGARS.
APPLICATION FILED SEPT. 6, 1905.
1,128,991.
Patented Feb. 16, 1915.
15 SHEETS—SHEET 3.

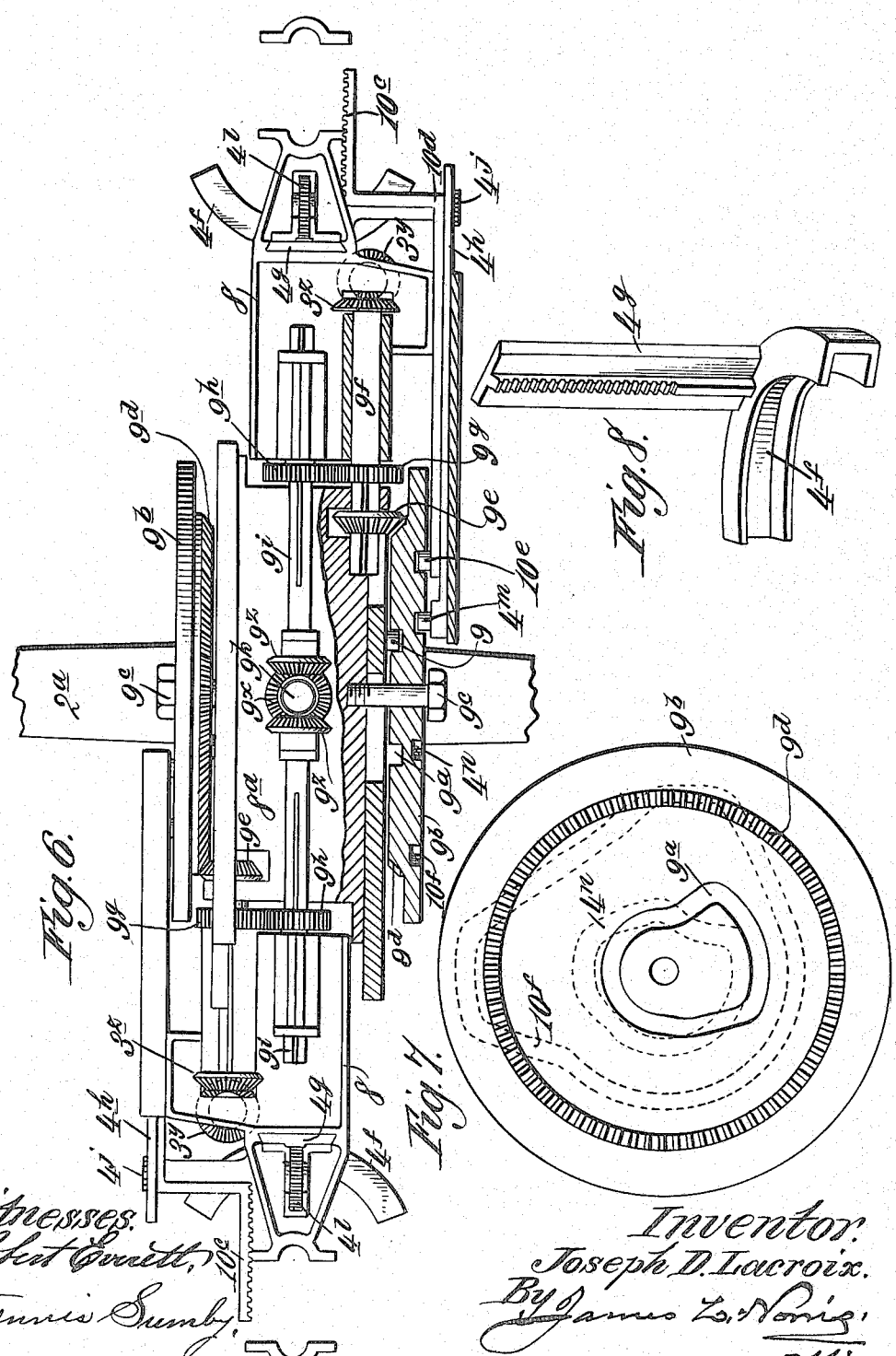

J. D. LACROIX.
MEANS FOR APPLYING WRAPPERS TO BUNCHES IN THE MANUFACTURE OF CIGARS.
APPLICATION FILED SEPT. 6, 1905.
1,128,991.
Patented Feb. 16, 1915.
15 SHEETS—SHEET 5.
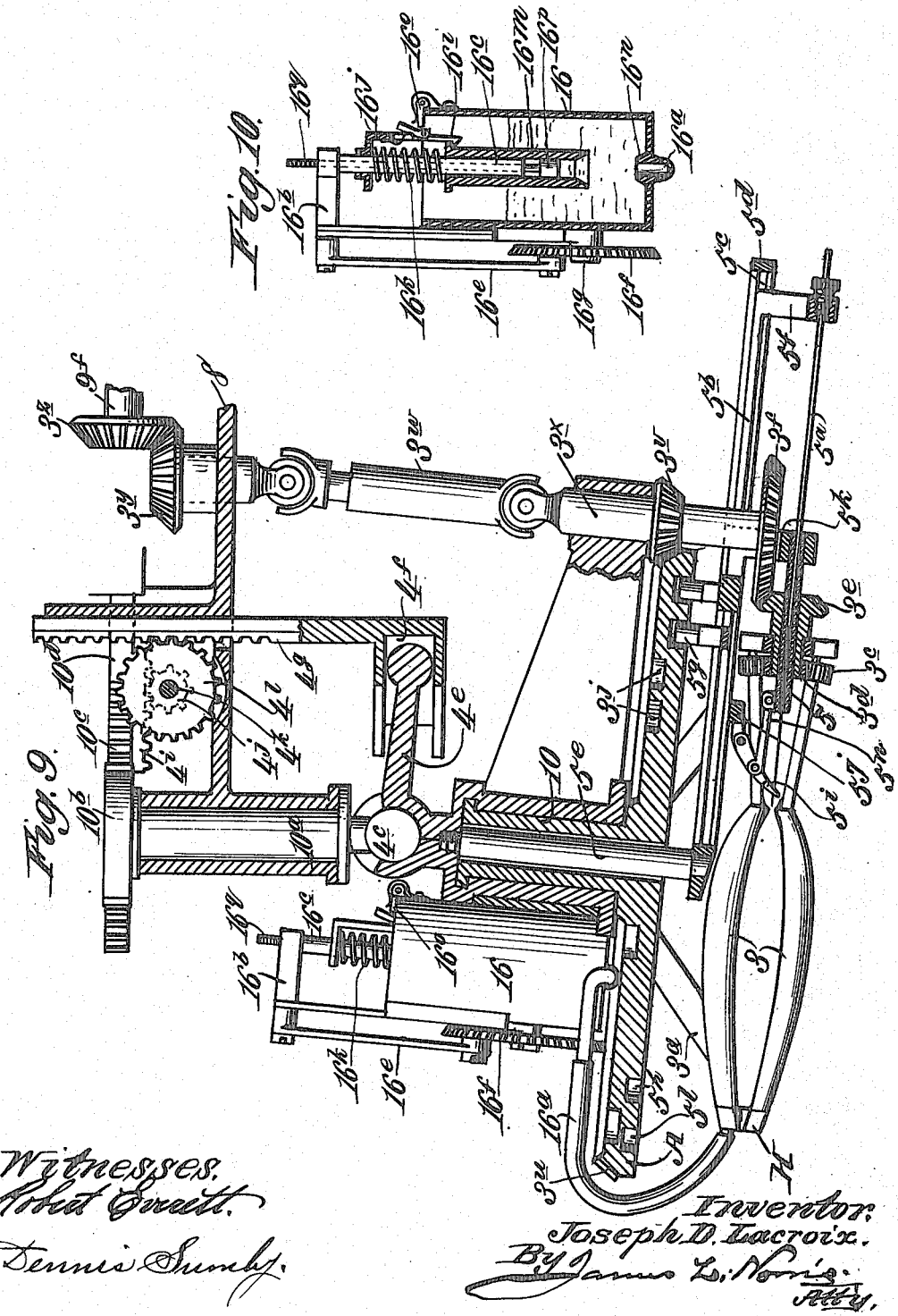
Witnesses.
Inventor:
Joseph D. Lacroix.
By James L. Norris.
Atty.

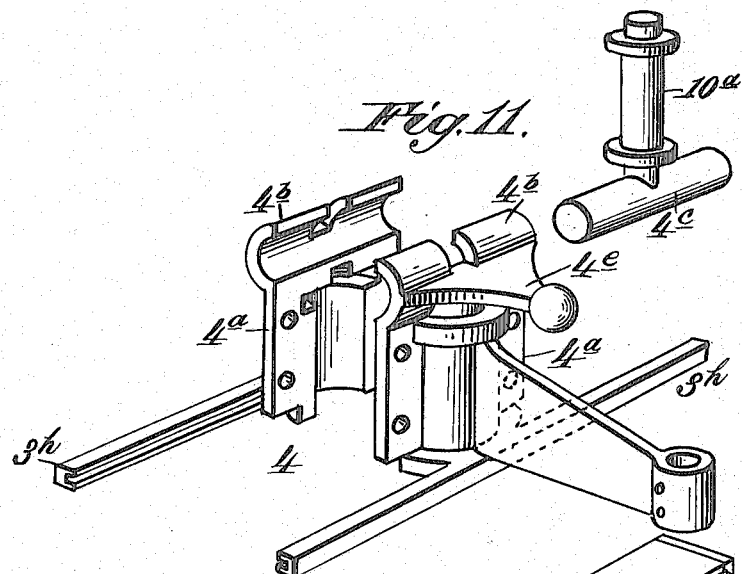
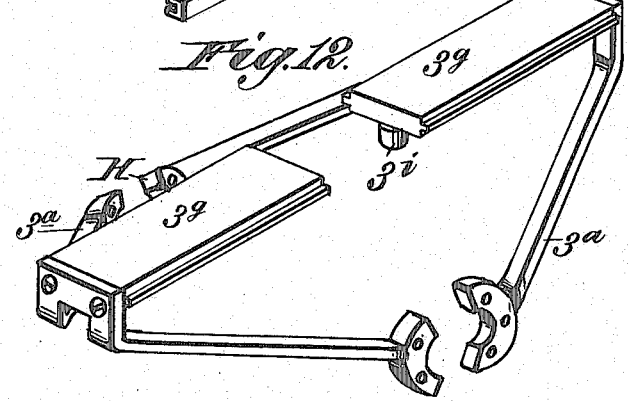
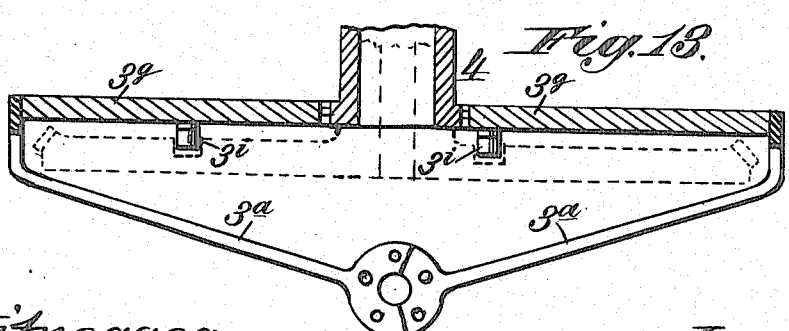

J. D. LACROIX.
MEANS FOR APPLYING WRAPPERS TO BUNCHES IN THE MANUFACTURE OF CIGARS.
APPLICATION FILED SEPT. 6, 1905.
1,128,991.
Patented Feb. 16, 1915.
15 SHEETS—SHEET 7.
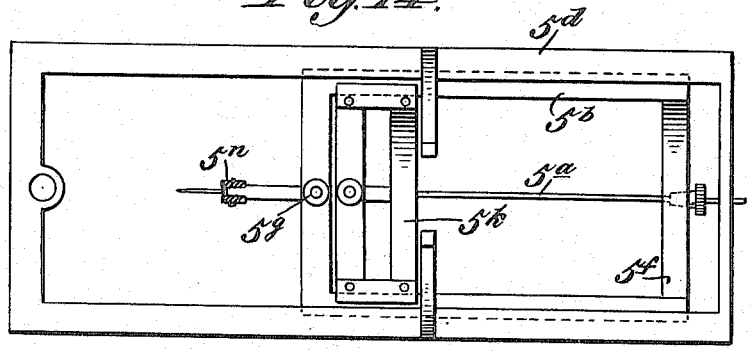
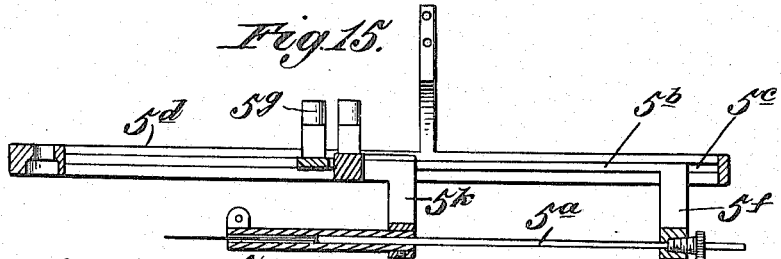
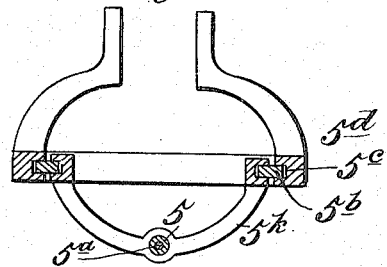
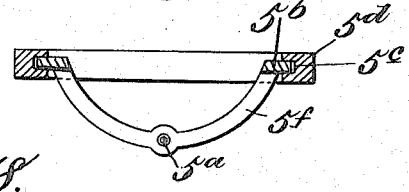
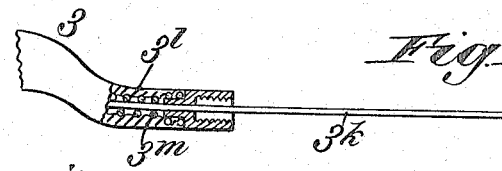
Witnesses.
Inventor.
Joseph D. Lacroix.

J. D. LACROIX.
MEANS FOR APPLYING WRAPPERS TO BUNCHES IN THE MANUFACTURE OF CIGARS.
APPLICATION FILED SEPT. 6, 1905.
1,128,991.    Patented Feb. 16, 1915.
15 SHEETS—SHEET 8.
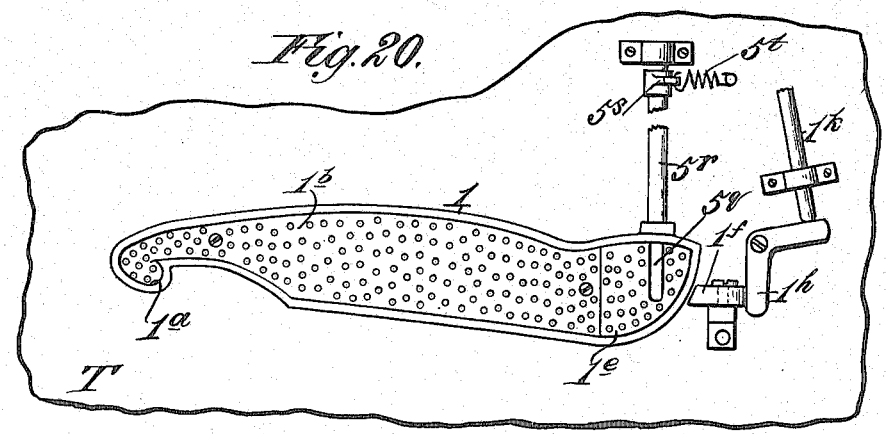
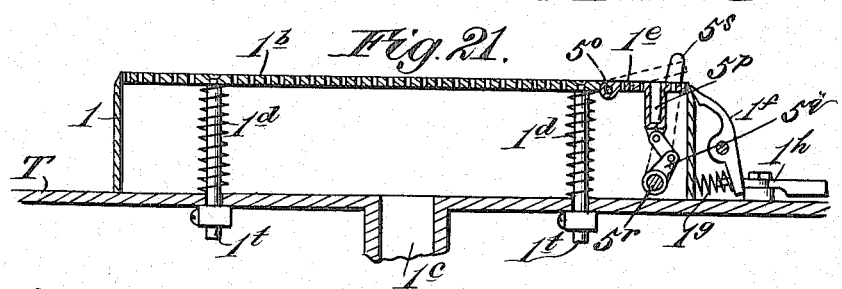
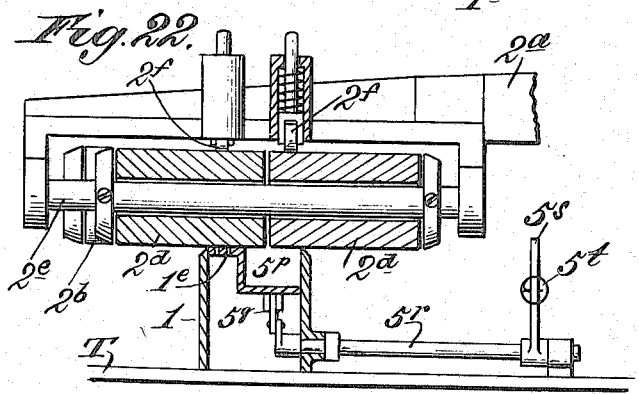
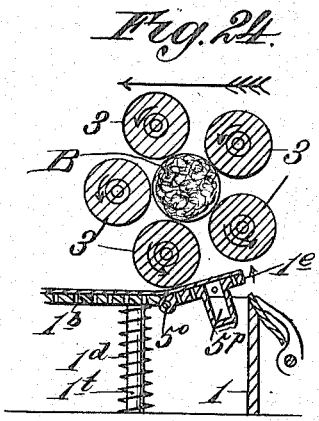
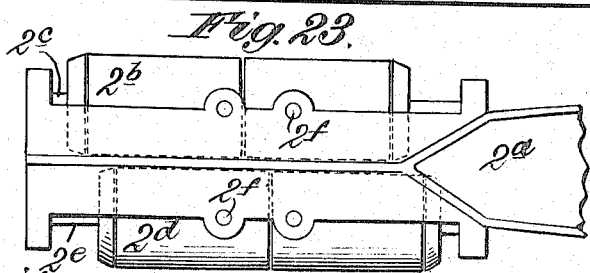
Witnesses.
Robert Everett
Dennis Sumby
Inventor.
Joseph D. Lacroix.
By James L. Norris
Atty.

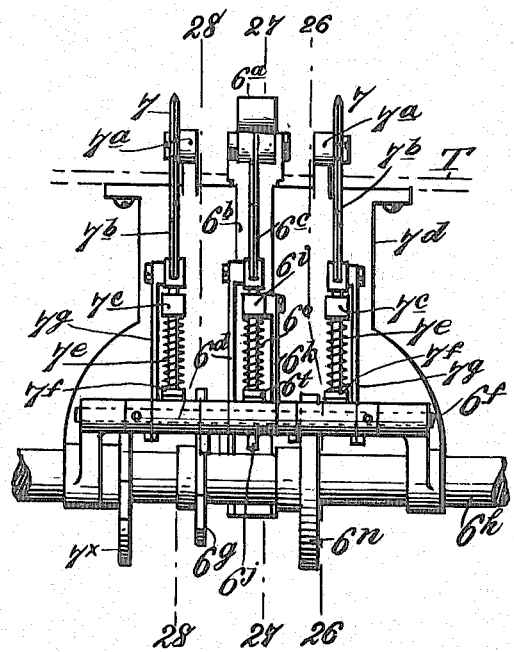

J. D. LACROIX.
MEANS FOR APPLYING WRAPPERS TO BUNCHES IN THE MANUFACTURE OF CIGARS.
APPLICATION FILED SEPT. 6, 1905.

1,128,991.

Patented Feb. 16, 1915.
15 SHEETS—SHEET 10.

Witnesses.

Inventor:
Joseph D. Lacroix.

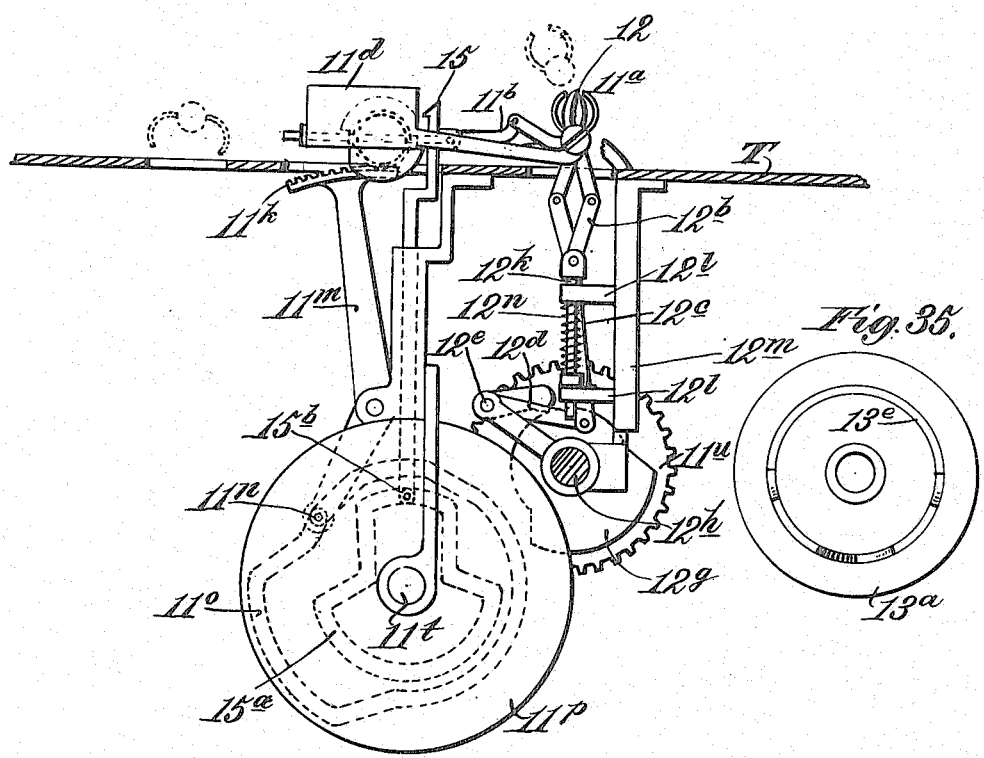
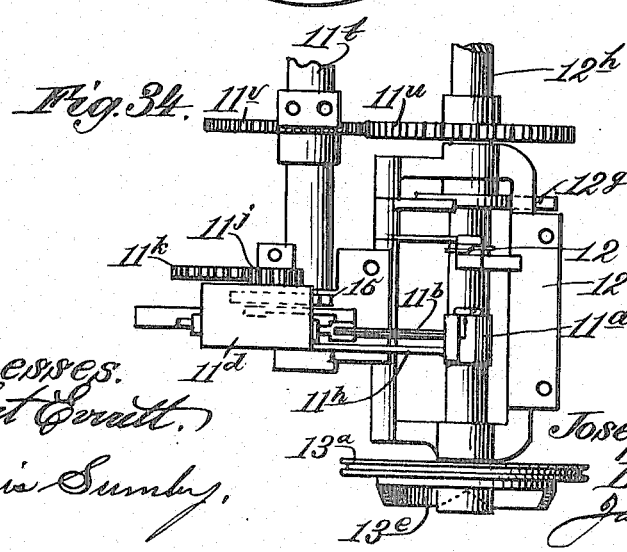

J. D. LACROIX.
MEANS FOR APPLYING WRAPPERS TO BUNCHES IN THE MANUFACTURE OF CIGARS.
APPLICATION FILED SEPT. 6, 1905.
1,128,991.
Patented Feb. 16, 1915.
15 SHEETS—SHEET 12.
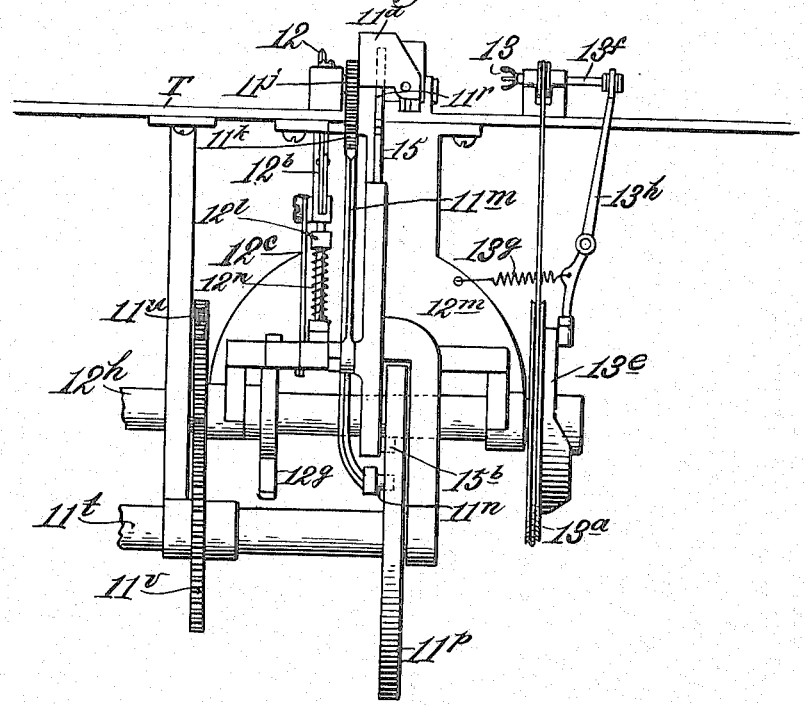

J. D. LACROIX.
MEANS FOR APPLYING WRAPPERS TO BUNCHES IN THE MANUFACTURE OF CIGARS.
APPLICATION FILED SEPT. 6, 1905.

1,128,991.

Patented Feb. 16, 1915.
15 SHEETS—SHEET 13.

Witnesses.
Robert Garrett,
Dennis Sumby.

Inventor.
Joseph D. Lacroix.
By James L. Norris,
Atty.

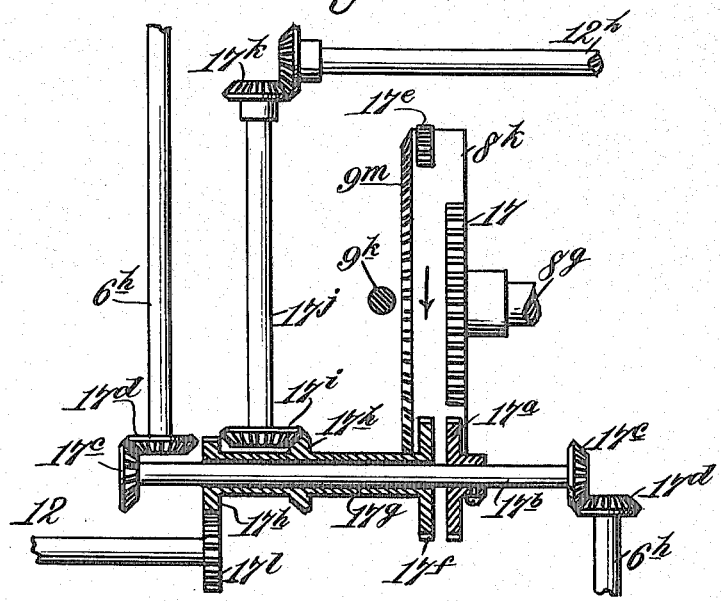
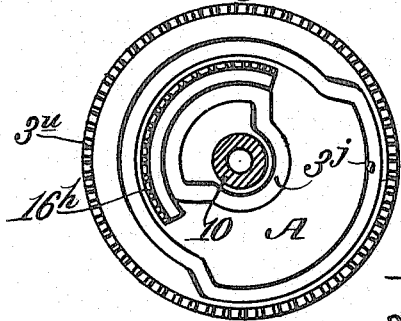
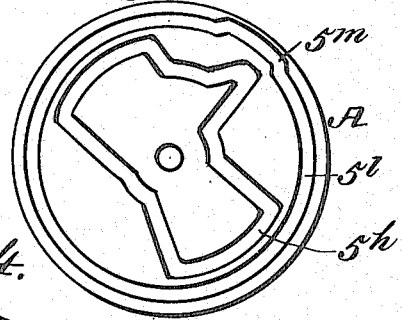
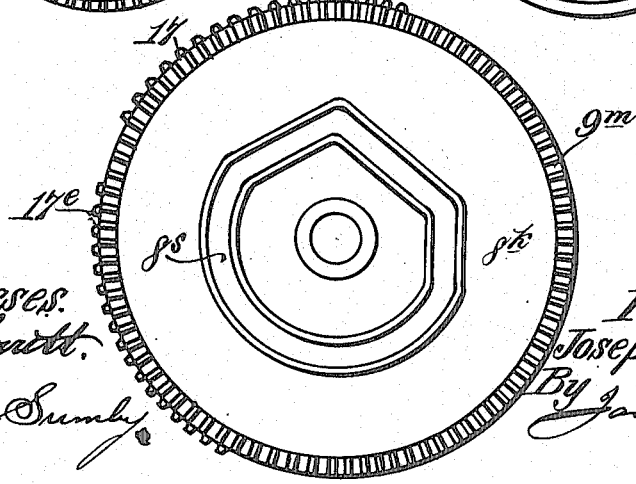

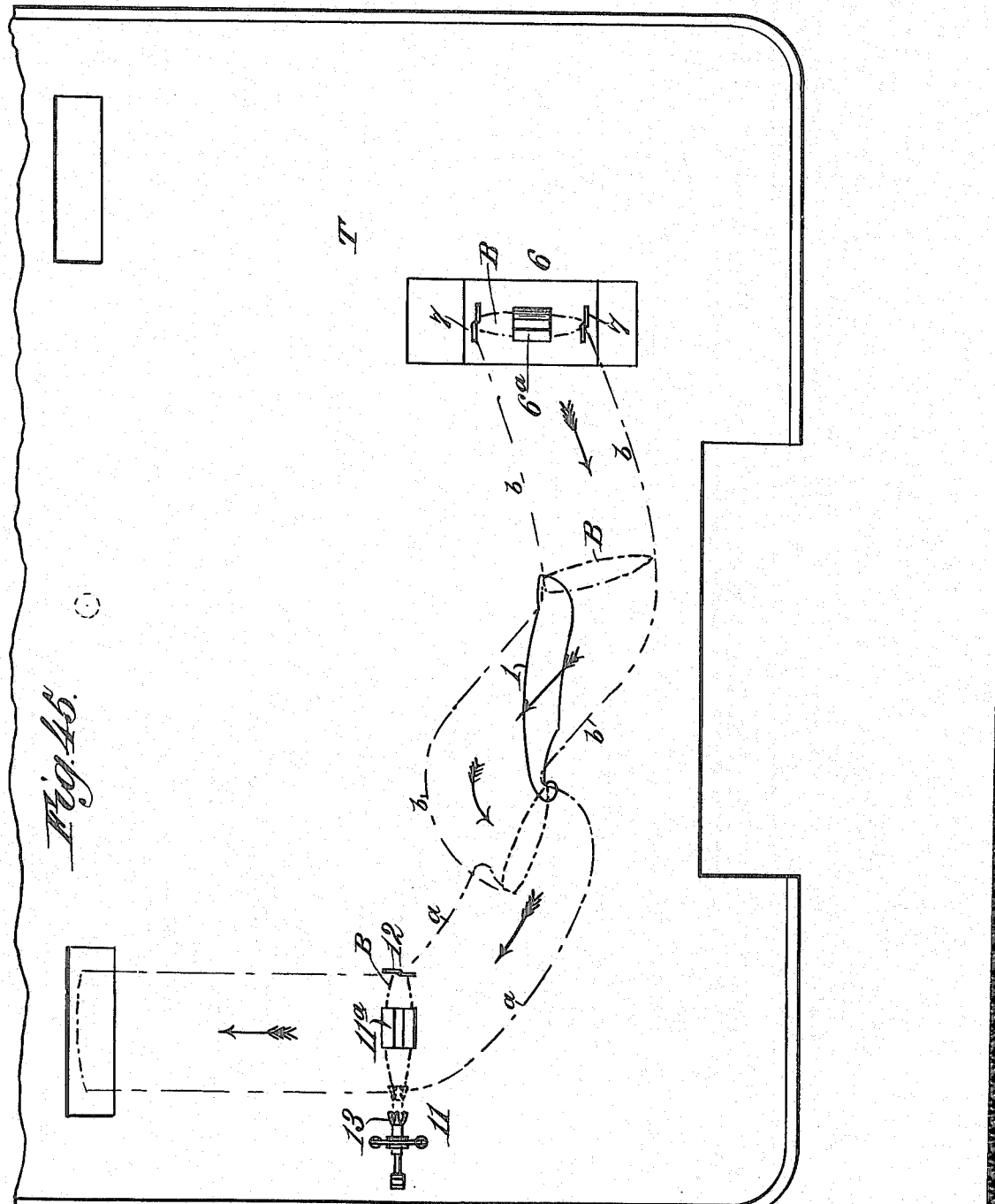

UNITED STATES PATENT OFFICE.

JOSEPH D. LACROIX, OF NEW YORK, N. Y., ASSIGNOR TO EUGENE H. DAVIS, OF NEW YORK, N. Y.

MEANS FOR APPLYING WRAPPERS TO BUNCHES IN THE MANUFACTURE OF CIGARS.

1,128,991.       Specification of Letters Patent.    Patented Feb. 16, 1915.

Application filed September 6, 1905. Serial No. 277,210.

*To all whom it may concern:*

Be it known that I, JOSEPH D. LACROIX, a citizen of the United States, residing at New York, in the county of New York and State of New York, have invented new and useful Improvements in Means for Applying Wrappers to Bunches in the Manufacture of Cigars, of which the following is a specification.

My invention relates to machines for applying wrappers to bunches in the manufacture of cigars; and it has for its object to provide an improved machine for accomplishing this work having a new mode of operation; novel elements and new combinations of elements for carrying out the complete operation; and new sub-combinations of elements for carrying out sub-steps thereof.

The mechanism which will be hereinafter described to illustrate one preferred organization is adapted for use with any suitable bunch making mechanism, or bunch making mechanism may be disposed in such operative relation thereto as to regularly deliver or supply bunches thereto as may be required and necessary, or at such times relatively to the operation of the novel mechanism involving the features of the present invention as to render the manufacture of cigars, such as the formation of the bunches and applying wrappers thereto, or rolling the bunches into the wrappers while the latter are held stationary, effective and expeditious.

With these objects in view, my invention resides in the machine hereinafter practically specified in preferred form; in the novel combination of the elements thereof; the new mode of operation; the novel sub-combinations of elements; the mode of operation of such novel sub-combinations of elements; and in the novel element and the manner of performing the functions thereof.

Figure 30:
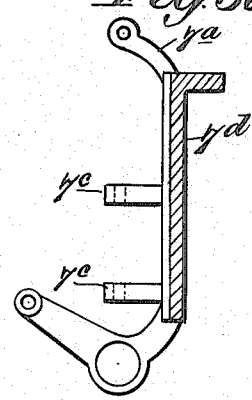
Figure 31:
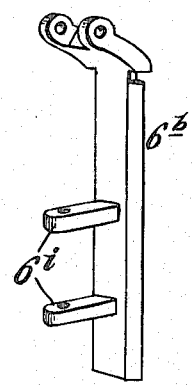
Figure 32:
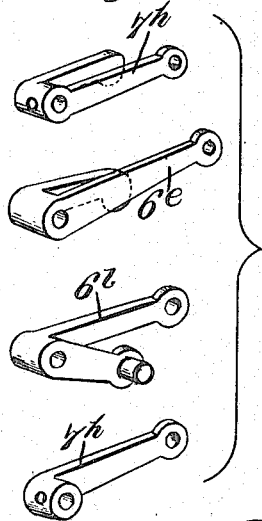
Figure 39:
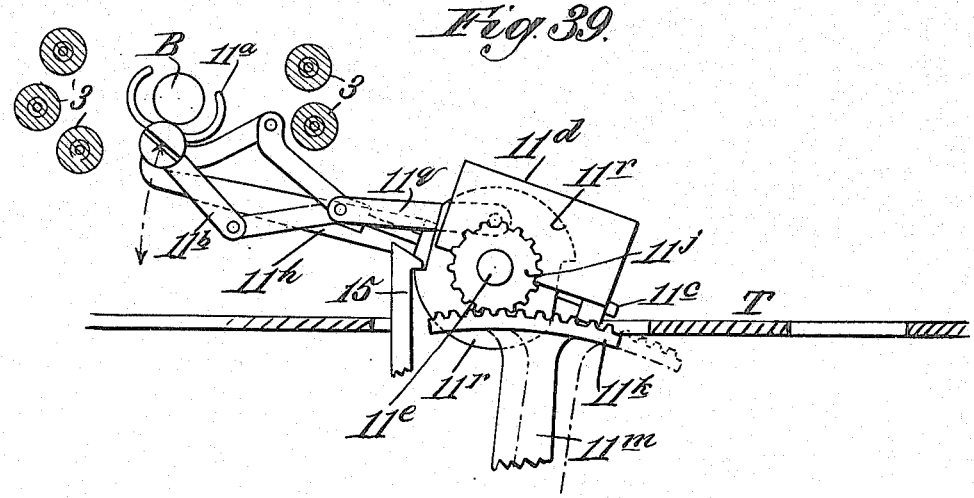
Figure 40:
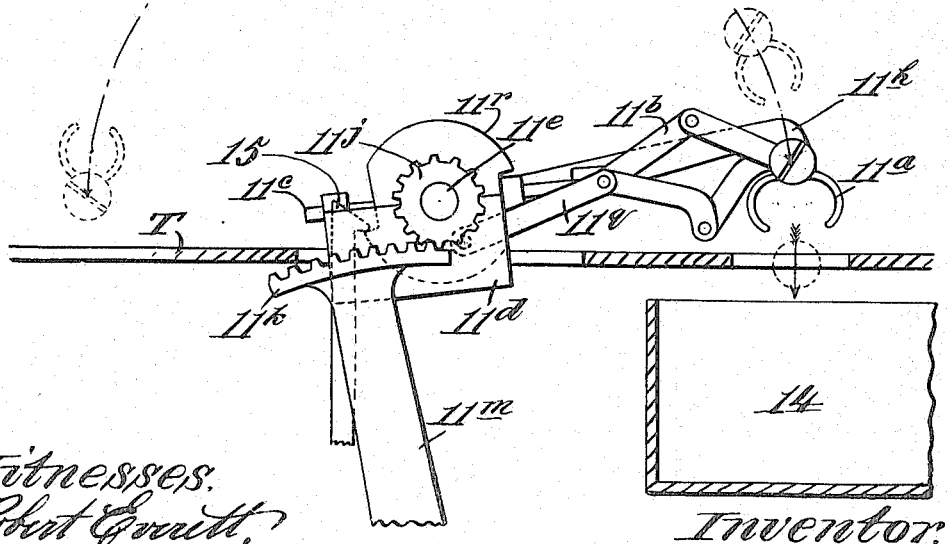

In the accompanying drawings: Figure 1 is a side elevation of a machine embodying in one practical form the features of the invention. Fig. 2 is a plan view thereof. Fig. 3 is a transverse vertical section taken through the center of the machine and only showing a part of the mechanism, and particularly illustrating the connections to the power shaft. Fig. 4 is a detail of part of means for taking care of the surplus of the tobacco leaf outside of the cut wrapper. Fig. 5 is a detail of the ratchet wheel through which intermittent differential travel is imparted to the wrapping rollers. Fig. 6 is a sectional plan view of the turn table and mechanism carried thereby and coöperating therewith. Fig. 7 is a detail of a cam wheel or disk provided with cam races and forming part of the machine. Fig. 8 is a detail perspective view of the rack bar forming a part of the means by which the wrapping rollers are rocked in a vertical plane. Fig. 9 is a sectional view illustrating the wrapping rollers, needle, and adjacent devices forming part of the mechanism for imparting various movements to said rollers and needles. Fig. 10 is a sectional view of the paste receptacle. Fig. 11 is a detail perspective of the frame from which the wrapping rollers are suspended. Fig. 12 is a perspective view of details of the wrapping roller supporting means. Fig. 13 is a sectional view of such means. Fig. 14 is a plan view showing the frame from which the needle guide and needle are supported. Fig. 15 is a sectional view of the parts shown in Fig. 14. Fig. 16 is a cross sectional view showing details of the needle guide support. Fig. 17 is a cross section showing details of the needle support. Fig. 18 is a detail of one of the wrapping rollers. Fig. 19 is a sectional detail of the construction of one of such rollers. Fig. 20 is a plan view of the wrapper cutting die and adjacent elements. Fig. 21 is a vertical sectional view through the wrapper cutting die. Fig. 22 is a front view illustrating the rollers coöperating with the die for cutting wrappers. Fig. 23 is a plan view of the parts shown in Fig. 22. Fig. 24 is a sectional view illustrating a portion of the wrapper cutting die and wrapping rollers during a period of the coöperation of said parts. Fig. 25 is an elevation illustrating the bunch deliverer and associated parts. Fig. 26 is a section on line 26—26 of Fig. 25. Fig 27 is a section on line 27—27 of Fig. 25. Fig. 28 is a section on line 28—28 of Fig. 25. Fig. 29 is a front view of the support and guide for the bunch trimming devices. Fig. 30 is a sectional view thereof. Fig. 31 is a perspective view of a bunch deliverer lift. Fig. 32 shows in detail the various forms of crank arms embodied in the bunch trimming and bunch delivering devices. Fig. 33 is a view partly in section and partly in elevation illustrating the mechanism for receiving wrapped cigars from the rollers and for trimming, polishing and discharging the cigars from the machine. Fig. 34 is a plan view of the parts shown in Fig. 33. Fig. 35 is a detail view of the cam controlling the in-and-out movement of the tip polisher. Fig. 36 is a side elevation of the cigar receiving, trimming and polishing mechanism. Fig. 37 is a view, partly in vertical section, illustrating the cigar receiver and correlated parts. Fig. 38 is a bottom plan view of the same parts. Fig. 39 is a detail elevation showing parts in section, illustrating the operation of the cigar receiver. Fig. 40 is a similar view illustrating further operation of the cigar receiver. Fig. 41 is a plan view, partially in section, of gearing, whereby the machine is driven in duplex. Fig. 42 is a face view of the cam wheel or disk showing the cam structures for opening the wrapper rollers, and segment gear for operating the paste delivery mechanism. Fig. 43 is a view of the opposite face of the cam wheel shown by Fig. 42, and illustrating the cam races for operating the tucking needle. Fig. 44 is an elevation of the inner face of the gear wheel for rotating the post which imparts various movements to the wrapping rollers and showing the cam for lifting the superstructure from which said wrapping rollers are suspended. Fig. 45 is a diagrammatic graphical view illustrating the path of movement of the wrapping rollers.

Before proceeding with the description of the machine embodying my invention in detail I desire to state that I have illustrated in the drawing a duplex machine in which the several operations hereinafter described are carried out sequentially or continuously, in duplicate. It will be understood, however, that my invention exists as well in a single as in a duplex or plurality machine. The machine may be organized to wrap a greater number of bunches during a cycle of operation, if desired, merely by adding the necessary elements for that purpose.

In describing my invention I will first set forth, by reference to the drawings in which I have illustrated the preferred embodiment of the complete machine, the several elemental features and the mode of operation thereof as a single mechanism, and will then refer to the connections by which the several mechanisms are arranged and operated conjunctively; the preferred embodiment of the several sub-combinations included in the machine; and the preferred character of the several elements involved.

The machine for the purpose of promoting a complete understanding of the invention will be described in respect to the various operations carried out thereby, and firstly:

*The wrapper cutting mechanism.*—The die hereinafter referred to constituting an element of the wrapper cutting mechanism serves primarily as a support for the wrapper and is, in a number of the claims appended to this description, claimed generically as a support, whether it has the attribute of a die, or whether it be a support of other character. In the preferred embodiment of my invention, the support for the wrapper serves also as an element of the wrapper cutting mechanism, and it will be described in this way without, however, intending thereby to restrict the invention in its broader aspects to a support which may be a bed within or connected to a cutting die.

The wrapping mechanism comprises, as best shown in Figs. 20 and 21, a die 1 consisting of a continuous cutting edge having a conformation adapted to cut from a leaf of tobacco a section of the required dimensions and shape to completely envelop or inclose a bunch, including the tip end thereof. To accomplish this purpose the die is provided at one end with a scroll cutting edge $1^a$ to impart to the wrapper a lip conforming to the shape of such scroll cutting edge, which lip, in the act of wrapping the bunch, will fit neatly about the tip or mouth end of the completed cigar. By this latter provision the necessity of utilizing auxiliary cutting mechanisms acting upon the wrapper during the course of the act of wrapping is obviated. Within the cutting edge of the die is arranged a plate $1^b$, conforming to the shape of such cutting edge, and perforated as shown, to permit of the action of suction upon that portion of the tobacco leaf that is to constitute a cut-out wrapper. Suction is exerted for the purpose of holding that portion of the tobacco leaf that is to constitute the wrapper firmly and smoothly, while being cut, through the perforated plate $1^b$ by way of conduit means $1^c$ leading from a suction apparatus to said plate, as best illustrated in Fig. 1. The suction may be controlled by a valve 19 (Fig. 1) connected to a treadle $19^a$ for operation at the will of the operator. The perforated plate $1^b$ is yieldingly supported, as best shown in Fig. 21, by means of springs $1^d$ and is guided by posts $1^t$ passing through the table T of the machine, whereby, when the tobacco leaf is initially laid upon the cutting die it is supported by the perforated plate in proper position to be cut; and said plate yields under the action of the rolls that coöperate with the cutting edge of the die, as hereinafter referred to, to facilitate a clean, clear cutting-out of the wrapper pattern. The perforated plate, near the butt-end thereof, is provided with a movable section $1^e$ which is shown as a pivoted section and is designed to perform the office hereinafter ascribed thereto in connection with the act of placing the end of the wrapper pattern within the control of the wrapping mechanism.

Means are provided whereby the tobacco leaf, outside the actual wrapper pattern to be cut therefrom, is engaged for the purpose of grasping said leaf firmly and enabling the operator to dispose the leaf initially in smooth condition upon the die, and to firmly hold the surplus of the leaf and prevent it in any way becoming engaged with or acted upon by the rolls that coöperate with the cutting die or by the subsequently acting wrapping mechanism. This means, a preferable character of which is illustrated in the drawings, consists of a finger $1^f$, the active end of which is normally held against the wall of the die 1, as best shown in Fig. 21, by means of a spring $1^g$. The active end of said finger is withdrawn from engagement with the wall of the die to permit the operator to insert a tobacco leaf between said active end and said wall, or to remove the surplus leaf remaining from the cutting of a previous wrapper and insert a new leaf, by suitable mechanism such as shown in the drawings, and consisting of a trip $1^h$ adapted to act upon the tail-end of the finger $1^f$ and which in turn is actuated by a pusher $1^k$, a fragment of which is shown in Fig. 20, and the continuation thereof in Fig. 4 of the drawings. This pusher is actuated periodically by means of a cam $1^m$; that is to say, after a wrapper has been cut and taken from the die by the wrapping mechanism, and when it is desired to arrange a new tobacco leaf in proper relation to the die, the operation of the cam $1^m$ being timed accordingly. The pusher actuating cam is carried by the rotating hub 2, which carries the rollers that coöperate with the die to effectuate the cutting of a wrapper (see Fig. 3.)

The rollers that coöperate with the die 1 to cut the pattern wrappers are carried by an arm $2^a$, as best shown in Figs. 2, 22 and 23. To attain the best results, I have designed that these cutting rollers shall be quadruplex, as will appear from Figs. 22 and 23, that is to say, there shall be a pair of rollers $2^b$ loosely mounted upon an axle $2^c$ journaled in the extremity of the arm $2^a$, and two rollers $2^d$ loosely mounted upon an axle $2^e$ fixed in said extremity. This particular arrangement provides for the possibility of the cutting edge at one side of the die 1 being, for some reason or other, at a different level from the cutting edge at the other side. Providing a pair of rollers upon the axle $2^c$, which rollers are independent of each other and capable of independent movement, and being loosely mounted upon the axle $2^c$, will compensate for any such possible irregularity in the desired nicety of alinement of the opposite sides of the cutting edge of the die. When this provision is made it follows that there will be a space of greater or lesser degree between the pairs of rollers on the axle $2^c$; and the section of wrapper which coincides with this space of separation, in the transit of the rollers over the die, may not be cut, because of the absence of pressure at the line of such coincidence. Since it is necessary that the wrappers shall be, with great certainty, completely cut out from the leaf, I provide the second pair of rollers arranged upon the axle $2^e$, which rollers sustain a staggered or lap relation with respect to the pair of rollers upon the axle $2^c$, whereby the space intervening the two rollers arranged upon the axle $2^c$ is taken care of by one or other of the rollers arranged upon the axle $2^e$, irrespective of the particular path of movement of said rollers.

In order to provide for an accurate operative register of the rollers with the die 1, to insure the certain and complete cutting of the wrapper, I have designed that the rollers will be held against the cutting edge of the die by spring-pressure exerted, in the particular example of mechanism illustrated in the drawings, by a spiral spring $2^g$ exerting influence on the hub 2 of the arm $2^a$ in which said rollers are arranged, as best shown in Fig. 3; and to provide for any adjustment that may be necessary, either in the initial setting of the machine or in the use thereof, I have provided that the said hub may be raised or lowered; and to this end I interpose between said hub and the table a nut $2^i$ (Fig. 3), so that the arms carrying the rollers may be adjusted accurately to the cutting edge of the die and, by manipulating this nut, if occasion demands, during the use of the machine, the adjustment may be altered.

Bearing upon the several rollers $2^a$ and $2^b$ are pressure devices $2^f$, carried in a suitable manner by the arm $2^a$, which act to maintain the several rollers in firm, rolling, cutting contact with the cutting edge of the die.

*Wrapping mechanism.*—In connection with the preferred embodiment of the wrapping mechanism illustrated in the drawing, and the manner of operation thereof, it will be observed that the wrapper pattern which is to be wrapped about the bunch remains upon the wrapper support, which in the present instance is a cutting die, and is not removed therefrom except as it is removed by the wrapping mechanism itself. By this organized mode of operation the heretofore usual means for picking up a wrapper from the die and conveying it to and delivering it into wrapping mechanism is entirely dispensed with. It will be observed, furthermore, that in the operation of the machine organized according to my invention, the bunch is rolled into the wrapper, and as contradistinguished from the mode of operation in many prior patented mechanical bunch wrapping machines, according to which prior machines the wrapper is pulled or dragged from a support and wrapped about the bunch. This new mode of operation of my mechanism is accomplished by retaining the wrapper upon a support and causing the wrapping mechanism with the bunch therein to move over the stationary wrapper, and roll the bunch into the wrapper. This mode of operation is of great practical value in that the wrapper is not stretched or subjected to undue tension. When a wrapper is dragged or pulled about a bunch according to prior patented mechanical wrapping mechanism, wrapper is stretched and is more liable to unwind or loosen itself upon the bunch and to become loosened upon the bunch when the latter shrinks upon drying, both of which objections, as well as many other practical objections, are obviated by a machine embodying my improved mode of operation. It will also be observed that according to the operation of the mechanism of this invention, as the wrapping mechanism rolls the bunch into the wrapper, it is also shaping the bunch similar to the manner in which a hand operator manipulates and shapes the bunch during the act of rolling it into a wrapper. The bunch is delivered in a crude or unshaped condition into the wrapping mechanism, which immediately closes upon the same and carries it to and over the wrapper support, initiating the shape of the bunch prior to reaching the wrapper support, in a manner similar to that in which a hand operator initiates the shape of a bunch before rolling it into a wrapper. My improved mechanism in moving over or with relation to the wrapper, proceeds to roll the bunch thereinto and complete the shape thereof during the wrapping operation.

In the drawing I have illustrated that which I regard as a preferred arrangement of wrapping mechanism, but wish it distinctly understood that my invention is not restricted to the character of wrapping mechanism shown, as, within the broader aspects of my invention, any suitable wrapping mechanism may be substituted therefor.

The wrapping mechanism, the preferred embodiment of which is illustrated in the drawing, partakes of the movements and performs the functions essential to the complete wrapping of a cigar, in the manner hereinafter set forth in connection with means whereby such movements are governed and imparted. This mechanism comprises rotatable rollers 3 supported in hangers $3^a, 3^a$, from a tiltable or oscillatable frame 4, hereinafter described. The rollers are arranged in an approximately circular series to embrace a bunch to be wrapped, as shown in Figs. 9 and 24, the space within such rollers constituting a rolling surface for rotating the bunch, and rolling it into the wrapper. A roller 3 is shown in detail in Fig. 18, and in sectional view in Fig. 19, wherein it will appear as provided with journals $3^b$ at its ends to have bearing in the hangers $3^a$. A head H, shown in Figs. 9 and 12, is associated with the wrapping mechanism. This head means, as clearly shown by Fig. 12, consists of a pair of semicircular collars or a split sleeve connected or supported in a manner which will be presently explained. At one end each roller is provided with a pinion $3^c$ which, when said rollers are closed upon a bunch, come into mesh with a gear $3^d$ centrally disposed with relation to the series of pinions $3^c$ and having an operating pinion $3^e$ loosely arranged upon a needle guide 5 and in mesh with a gear $3^f$ which drives the series of wrapping rollers. The gear $3^f$ is mounted upon a shaft $3^x$ provided with a pinion $3^y$, gearing with a pinion $3^z$ on a shaft $9^t$, which receives motion from a pinion $9^x$ on a post $9^k$, through the train of gear wheels $9^h$ and $9^g$, Figs. 2, 3 and 6, and hereinafter described. When the cluster of wrapping rollers are to be rocked in a vertical plane, as when a cigar shaped bunch is to be wrapped, the shaft $3^x$ is made extensible to accommodate the different positions assumed by the wrapping rollers in this oscillating or tilting action. As preferred and shown, the shaft is made extensible by incorporating therewith an extensible section $3^w$ having a member $3^{z\prime}$ telescopically assembled in relation thereto, as best shown in Fig. 9. The parts of the shaft $3^x$ including the section $3^w$ and member $3^{z\prime}$ are connected by joints $3^{w\prime}$ to permit the said shaft to move at intermediate points in conformity to the position of the mechanism coöperating therewith and depending thereon for actuation.

The hangers $3^a$ in which the rollers are rotatably mounted are connected to the head means H and are shown in detail in Figs. 12 and 13, and are capable of being moved toward and from each other to separate the rollers for the purpose of receiving and discharging a bunch, part of said rollers being journaled in one of said hangers, and part in the other thereof. The said hangers are connected to slides $3^g$ (Fig. 12) arranged to move in guides $3^h$ (Fig. 11) carried by the tiltable or oscillatable frame 4, and said slides are provided with studs $3^i$ which engage in cam races $3^j$ (see Fig. 13) in the upper face of a cam wheel or disk A, shown in detail in Fig. 42. Said cam-races, as shown, are of the same configuration, but oppositely disposed,—that is to say, that part of one of said races which tends to move one of the hangers away from the other points radially in one direction and the corresponding part of the other race points radially in the opposite direction; whereby, when said cam disk or wheel is rotated periodically and at the proper time, as hereinafter referred to, the group of wrapping rollers will be separated to provide entrance and exit for a bunch.

I prefer to construct the rollers in the manner shown in Fig. 19 of the drawings. As shown in this figure, the roller is composed of a shaft $3^k$ carrying a yielding cover $3^l$ which may be of felt, rubber or other suitable material capable of frictionally hugging the bunch to rotate the same without injury; and, if desired, the cover $3^l$ may include springs $3^m$ to provide a yielding core. The shaft and the cover associated therewith are detachably connected to a sleeve $3^n$ by any suitable detachable connection $3^o$, such as screw-threads, as shown. The sleeve carries the pinion $3^d$ and the shaft passes through the sleeve and projects beyond the pinion as shown in Fig. 18, to provide the journal $3^b$. By reason of this separable construction of roller, the shaft and cover may be readily taken out of the machine without disturbing other parts, and rollers of different configuration, to accord with various shapes of bunches, substituted therefor.

It is designed according to the particular embodiment of my invention illustrated, that when the wrapping rollers are to receive a bunch they will be separated as hereinbefore described and then closed upon the bunch; and when the bunch has been wrapped they will be again separated to permit the cigar to be taken therefrom. It will be observed that the rollers are constantly rotated during the entire cycle of operation of the machine except when they are separated or opened to receive the bunch or to discharge a wrapped cigar.

I prefer to employ and have illustrated mechanism for introducing a bunch into the series of wrapping rollers, and mechanism for taking the same therefrom after the wrapping operation has been completed. The driving mechanism is so timed that the rollers will be separated to accomplish these operations. With this object in view I provide a bunch deliverer, the relative position of which in the organized machine is illustrated in Fig. 2 of the drawing, at 6. It is designed that a bunch to be wrapped may be placed in this bunch deliverer and by it be delivered within the bunching rollers.

The bunch deliverer, designated generally by the numeral 6, is illustrated in detail in Figs. 25, 26, 27 and 28, and comprises a pair of pivotally connected jaws $6^a$ carried by a lift or elevator $6^b$, (Figs. 26 and 31) and combined with a lazy tong structure $6^c$, the controller $6^d$ of which is attached to one arm of a crank $6^e$ mounted on the axle $6^f$, see Fig. 32. The other arm of this crank rides upon a cam $6^g$ arranged upon a periodically driven shaft $6^h$, as best shown in Fig. 27. The lift or elevator $6^b$ is provided with guide brackets $6^i$ in which the lazy tong construction is fitted and by which the stem $6^j$ thereof is guided in its movements. The lift or elevator is connected by means of a link $6^k$ with one arm of a crank $6^l$, Figs. 26 and 32, arranged on the axle $6^f$, the other end of which works in a cam-race $6^m$ in a cam disk $6^n$. The cam $6^g$ and cam disk $6^n$ are so positioned upon the shaft $6^h$ that they operate in sequence, the one $6^n$ serving through the described connections to move the lift or elevator $6^b$, the lazy tong construction and the bunch receiving jaws $6^a$, as a unit, an appropriate distance above the table T, after which the cam $6^g$, acting through the crank $6^e$ and controller $6^d$, acts upon the lazy tong and opens the jaws $6^a$ to receive a bunch; and in this action a spring $6^o$ combined with the stem $6^j$ of the lazy tong, bearing at one end against one arm of the guide bracket $6^i$, and, at the other end against a collar $6^t$ upon said stem is compressed, and serves, after the operations just described, to close the jaws upon the bunch. The bunch deliverer is returned by the cam race $6^m$ and connections referred to. When the bunch deliverer has thus assumed its initial position, possessed of the bunch, I have found it desirable to clip off the ends of the bunch for the purpose of having the same neat, and to the end that the several bunches to be wrapped shall be of uniform length. To accomplish this purpose I provide bunch clipping mechanism, the preferred construction, arrangement and mode of operation of which are illustrated in the drawings in detail in Figs. 25 and 28. The bunch clipping means shown consists of pairs of shears arranged at opposite ends of the bunch deliverer, and each of which clipping mechanisms comprises shear blades 7 pivoted together and to a bracket arm $7^a$ connected to a contiguous part of the machine frame $7^d$. Associated with these shear blades are lazy tong structures $7^b$, the stems of which, as best illustrated in Fig. 28, pass through and are guided by eye-guides $7^c$ projecting from the part $7^d$ of the machine frame. The stems of said lazy tongs are surrounded by springs $7^e$ bearing at one end against one of the eye guides $7^c$, and, at the other end, against collars $7^f$ secured to said stems. Connected to the lazy tongs $7^b$ are controllers $7^g$, to which bell cranks $7^h$ and $7^{h'}$, secured on the axle $6^f$, are connected. The bell crank $7^h$ has an arm that engages a cam $7^x$ arranged on the shaft $6^h$, as best shown in Fig. 28. This cam is so positioned upon said shaft that, during the upward movement of the lift $6^b$ to receive the bunch, the shear blades will be opened and maintained in that position until the bunch deliverer has descended to its initial position, whereupon the shear blades will be caused to shear off or trim the ends of the bunch. At this time and in the manner hereinafter described, the bunch wrapping mechanism will have arrived at a position above, in the example of machine shown in the drawing, and coincident with the bunch deliverer. When the bunch wrapping mechanism arrives over the bunch deliverer, the said wrapping mechanism is opened or the wrapping rolls 3 are expanded as hereinbefore explained, and the jaws $6^a$ are elevated through the medium of the lift $6^b$, and after the bunch is raised within the grasping plane of the wrapping rolls it is released and held within the rolls and the jaws $6^a$ are then lowered to clear the bunch wrapping mechanism and the latter then starts to swing around toward the wrapper support.

An important characteristic of a machine organized according to my invention resides in the fact that the bunch wrapping mechanism, with the bunch disposed therein, moves across the wrapper support and wrapper, and rolls the bunch into the wrapper. Suitable means are provided for causing said wrapping mechanism to move across the die for this purpose, and suitable means are provided whereby there is a change of position of bunch wrapping mechanism during the movement of the latter across the die. When the bunches to be wrapped vary in shape, such as perfectos, panetelas, puritanos, and other standard sizes and shapes, the mechanism described provides for the differences of contour of the several cigar forms mentioned and all others to which it may be desirable to apply a wrapper.

In the accompanying drawings I have illustrated an organism in which the die remains stationary and the relative movements above referred to are attained by the path traversed by the wrapping mechanism, which path is graphically illustrated in Fig. 45, wherein the die is designated by the numeral 1, the bunch within the wrapping mechanism by the letter B, and the path of movement of the bunch, while held in the wrapping mechanism, is indicated by the dotted lines $b$, and from which it will be observed that the wrapping mechanism and the bunch contained therein approach the tuck-end of the wrapper upon the die at substantially right-angles, then take a curvilinear path across the die, and then move in a reverse curvilinear path to take up on the tip end of the bunch the tip end of the wrapper, after which the wrapping mechanism travels around, as shown at $a$, and is presented to trimming and tip polishing apparatus as hereinafter referred to. During the travel of the wrapping mechanism along the path of movement graphically and approximately illustrated in Fig. 45 of the drawing, said mechanism is also in the process of wrapping a cigar shaped bunch, and rocked or tilted in a vertical plane to compensate for the bellied conformation of the bunch, as will be described.

According to my invention, in the particular example thereof illustrated, the wrapping rolls have a primary movement in a circular path, modified as hereinabove indicated when a cigar shaped bunch is being wrapped; and this is accomplished as shown, by connecting the tilting frame 4, from which the wrapping rolls are hung, to the outer end of a beam 8, (Fig. 1) the inner end of which is secured to or forming part of a turn-table $8^a$ mounted on a swivel sleeve $8^b$, as best shown in Fig. 3. This sleeve is provided with a ratchet $8^c$ loosely mounted upon which, as best shown in Fig. 5, is a segment gear $8^x$, carrying a pawl $8^y$ to engage the ratchet. The segment gear $8^x$ is in mesh with a segment pinion $8^d$ on a rocking arm $8^e$ having an arc-shaped elongated opening fitting about the hereinafter described main driving shaft $8^g$ (see Fig. 1), and pivoted at its lower end upon a pin $8^h$. Said rocking arm is provided with a stud $8^i$ (Fig. 1) that works in a suitably patterned cam-race $8^j$ in a wheel $8^k$ on the main driving shaft $8^g$, whereby upon rotation of said wheel $8^k$ by said driving shaft, the rocking arm is caused to partake of oscillating movements of greater or lesser degree, determined by the length of the active portions of the cam-race $8^j$, to impart greater or less rotation in one direction to the swiveled sleeve $8^b$ depending upon the degree of movement to be imparted to the wrapping mechanism, as for example, in moving into coöperative relation with the bunch deliverer, thence to the die 1, and thence to the bunch receiver, hereinafter referred to. In the course of travel of the wrapping mechanism, periods of stoppage must occur so that the rollers will remain at rest coincident with the bunch deliverer a sufficient time to enable the wrapping mechanism to be separated to receive the bunch, as hereinafter described, the bunch to be delivered thereinto, and the wrapping mechanism to close about the bunch; again when the wrapping mechanism arrives at the place where it is to take the wrapper from the cutting die, where it stops sufficiently long to enable the needle to tuck in the end of the wrapper; again when the wrapping mechanism is taking up the lip of the wrapper and wrapping it about the head or tip end of the bunch; and again when the wrapped cigar is to be discharged from the wrapping mechanism and handed over to the receiver hereinafter described.

The travel of the wrapping mechanism between stoppage or points of rest, and the speed of movement during said travel is controlled by the shape of the cam-race 8$^j$. The periods of rest occur when the segment gear 8$^x$ is returning after its active stroke, the pawl 8$^y$ riding over the periphery of the ratchet 8$^c$ between the teeth of said ratchet. The wrapping mechanism during its operation is being continuously presented with the bunch to the wrapper at different angles of presentation and variable speeds. While traveling over the wrapper support and wrapper held stationary on the latter, and during such operations, the wrapping mechanism and bunch are being tilted with relation to the wrapper and in conformity to the shape of the bunch, and at the same time the wrapper applying mechanism has a vertical movement imparted thereto.

The elements thus far described are sufficient to accomplish the operation of cutting a wrapper and applying the same to a cylindrical bunch.

When a bunch is to be wrapped, the required path of movement of the wrapping mechanism and variations of operative direction and relation of the wrapping mechanism, and the bunch contained therein, to the wrapper, hereinabove generally indicated, is imparted by suitable mechanism, the preferred construction, arrangement, and mode of operation of which are illustrated in the drawings, wherein the beam 8, by which the wrapping mechanism is carried, is provided with a stud 9 working in a suitably patterned cam-race 9$^a$ in a cam disk 9$^b$ rotatably mounted upon a stud 9$^c$ affixed to the turntable 8$^a$. The pattern of the cam race 9$^a$ is such, as shown in Fig. 7, that the beam 8 is caused to move radially in and out with respect to the vertical central line of the machine for the purpose of causing the wrapping mechanism and the bunch therein to move spirally in and out, see Fig. 45, across the die 1, whereby the bunch is presented at variable angles to the wrapper. The cam wheel 9$^b$ imparts a variable speed to the beam 8 and the turn table 8$^a$ which carry the wrapper applying mechanism to cause the latter to have a slower movement relatively to the wrapper at certain intervals than at other times, and by such variable speed the wrapper applying mechanism carrying the bunch is caused to have a proper movement over the support. The beam 8 has a tongue 8$^{xx}$ movable in channel 8$^w$ in the turn-table 8$^a$. The cam disk 9$^b$ is shown provided with a bevel gear 9$^d$ on its inner face in mesh with a pinion gear 9$^e$ on a shaft 9$^f$ having a gear wheel 9$^g$ in mesh with a similar gear 9$^h$ on a shaft 9$^i$ provided with a bevel pinion 9$^z$ (see Fig. 6) on its inner end in mesh with a bevel pinion 9$^x$ on the upper end of a post 9$^k$ located within the swivel sleeve 8$^b$ (see Fig. 3), which post is rotated (and, through the connections described, imparts rotation to the cam disk 9$^b$) by means of a pinion 9$^l$ splined on said post and meshing with a bevel face gear 9$^m$ upon the cam wheel 8$^k$ upon the main driving shaft 8$^g$, whereby constant rotation is imparted to said post 9$^k$ and, through the connections described, to the cam disk 9$^b$.

Aside from the control of the angle of approach of the bunch to the wrapper in a horizontal direction, which is regulated in the manner just described, it is desirable, for perfection of work, that the wrapping mechanism shall also assume different angular positions in a vertical direction to present the bunch at its narrow head or tip and tuck ends in the same relation to the wrapper as the middle or bellied out portions of the bunch, and, to accomplish this, I provide for tilting the wrapper applying mechanism. This object is accomplished preferably by means best illustrated in Fig. 9 of the drawings, which means may be described as follows: The tiltable or oscillatable frame 4 from which the wrapping mechanism is hung, as before described, is constructed of two halves or sections 4$^a$ (Fig. 11), said halves or sections being shaped, as shown at 4$^b$, to constitute a socket to receive a T-connection 4$^c$ by which said frame and the parts supported thereby are suspended from the beam 8. The frame 4 is capable of tilting or oscillating upon the T-connection 4$^c$, and this movement is imposed by means of a lateral arm 4$^e$ projecting from the frame. The end of the arm enters an arc-shaped channel 4$^f$ on a rack-bar 4$^g$, shown in detail in Fig. 8. The arc-configuration of this channel is to permit the end of the arm 4$^e$ to move in the arc of a circle when the wrapping mechanism is caused to travel about a vertical axis, as hereinafter described, and still be in engagement with the walls of said channel whereby in any position assumed by the wrapping mechanism the arm will be in coöperative relation to the rack-bar to cause the tilting or oscillating motion referred to. This rack-bar is reciprocated by connections from the cam-wheel 9$^b$, such connections, in the illustrated organism, comprising a slide 4$^h$, (Fig. 6) provided with a rack 4$^i$ (Fig. 1) meshing with a gear 4$^j$ arranged on a shaft 4$^k$, upon which shaft is also arranged a gear 4$^l$ in mesh with the rack-bar 4$^g$, as best shown in Fig. 9. The slide 4$^h$ is provided with a roller 4$^m$ working in a cam-race 4$^n$ in the cam-wheel 9$^b$ (Fig. 6), such cam-race being of proper conformation to cause the proper degree of tilting or oscillating motion to be imparted to the wrapping mechanism to accomplish the purpose hereinabove referred to. As the wrapping mechanism is tilted in this vertical direction it is also bodily lifted away from the wrapper support so that in the tilting or oscillating motion thereof the wrapping mechanism will maintain a like operative relation to the wrapper; and this is accomplished by means of a stud $8^r$ carried by the sleeve $8^b$ and working in a cam-race $8^s$ in the wheel $8^k$, by which means the wrapping mechanism is gradually lifted during its tilting or oscillating motion, so that its coöperative relation to the wrapper support is maintained. When the wrapping mechanism is thus moved, the post $9^k$ is correspondingly lifted to maintain its coöperative relation with the pinion $9^z$ by means of collars $8^t$ which connect said post with the sleeve $8^b$ for the purpose of this action.

In addition to the movements imparted to the wrapping mechanism hereinabove described, said mechanism is arranged to travel about a vertical axis, as stated, for the purpose (which can be best understood by reference to Fig. 45) of moving the bunch from a radial position with respect to the center of general circular travel of the wrapping mechanism while it is being moved in and out with respect to said center during the course of travel over the wrapper, to present the bunch in proper relation to the wrapper in the act of taking said wrapper up and wrapping it about the bunch. Such traveling motion of the wrapping mechanism about a vertical axis during this operation imparts, through the medium set forth, a curvilinear or spiral path of movement illustrated in Fig. 45, whereby the wrapping mechanism approaches the tuck-end of the wrapper in proper relative position thereto; then travels across the wrapper in a curved path; then outward in a curved path to permit the properly shaped tip end of the wrapper to be wrapped about the tip or head end of the cigar; after which the wrapping mechanism and the cigar therein are caused to travel as illustrated in Fig. 45, to be presented properly for coöperation with the cigar trimming and polishing devices. This movement of the wrapping mechanism is accomplished, in the example of machine illustrated, in the following manner: The frame 4 from which said wrapping mechanism is hung is swiveled about a sleeve 10 projecting from the cam disk or wheel A, (Fig. 9) and the T-connection $4^c$ is provided with a stem $10^a$ (Fig. 9, said T-connection being shown in detail perspective in Fig. 11,) upon which stem a gear wheel $10^b$ is mounted. With this gear wheel a rack $10^c$ upon a slide $10^d$ (Fig. 6) engages, said slide being provided with a stud $10^e$ working in a cam-race $10^f$ in the wheel $9^b$, such race being of proper contour to cause the described traveling movement of the rollers at the proper time.

Again referring to Fig. 3, particular attention is called to the fact that the segment $8^x$ carrying the latch $8^y$ is caused to move by the segment $8^d$ having the roller $8^i$ working in the cam race $8^j$ in the cam wheel $8^k$, the revolution of the cam wheel $8^k$ rotating the segment $8^d$ to move the ratchet $8^c$ which is fastened to the shaft $8^b$. The movement of the segment $8^d$, therefore, causes the segment $8^x$ to simultaneously move forward and operate the beam with the wrapping mechanism around and over the die. The return movement of the segment $8^x$ causes the ratchet $8^y$ to catch another notch in the ratchet wheel $8^c$, and while this return movement is taking place the wrapping mechanism is at a standstill, or remains motionless, so far as traveling movement thereof is concerned. It will be noticed that the notches in the ratchet wheel $8^c$ are different distances apart, and the movement of the said ratchet wheel is thus timed with relation to the cam wheel $8^k$, so that the latter cam wheel will give to the wrapper applying mechanism, through the operation of the ratchet wheel, a difference in the time of stopping or intervals of movement thereof required for taking up the bunch and tucking in the tuck end and head end of the wrapper, and also while delivering the cigars to the cutting and head polishing means. The stops or intervals of rest of the traveling movement of the wrapper applying mechanism are effected while the cam wheel $8^k$ causes the segment $8^x$ to return far enough to actuate the latch $8^y$ to engage the succeeding notches of the ratchet wheel $8^c$, and when the cam wheel $8^k$ causes the segment $8^x$, carrying the latch $8^y$, to move forward to engage the succeeding notches of the ratchet wheel $8^c$, a step by step movement is produced with respect to the wrapper applying mechanism, and this movement is variable with the distance of throw that the cam wheel is capable of giving, or for which it may be timed to give.

Again referring to Figs. 6 and 7, the cam $9^b$ controlling the spiral or, more properly, the twisting movement set forth with respect to the bunch during movement thereof in relation to the wrapper has the pin $10^e$ working therein, said pin being carried by the slide $10^d$ and operating to give the wrapping mechanism a turning movement, or an axial rotation to the means for carrying the bunch. The roller $4^m$ carried by the slide $4^h$ works in the cam wheel $9^b$, and the latter meshing with the gear wheel $4^j$ connected to the shaft $4^i$ gives a tilting movement in a vertical plane to the wrapping mechanism. The stud or roller 9 working in the cam wheel $9^b$ and projecting from the beam 8, gives a horizontal in and out or radial movement to the wrapper applying mechanism with relation to the center or axis of the machine. Therefore, it will be seen there are four movements given to the wrapping mechanism, besides the vertical movement imparted thereto by the operation of the cam wheel $8^k$, which has the raceway $8^n$ engaged by the stud or roller $8^r$ carried by the shaft $9^k$. These movements give all the angular positions to the wrapper applying mechanism necessary to effectively and snugly cause the wrapper to surround all parts of the bunch. A needle $5^a$ is associated with the wrapping rollers for performing the function of receiving bunches from the bunch-deliverer when presented in between the wrapping mechanism, as before described, and supporting said bunch until the wrapping mechanism closes thereabout; and for carrying the tuck-end of the wrapper into the wrapping mechanism and holding it in contact with the bunch until the wrapping mechanism has attained complete control thereof. When the wrapped cigar is to be delivered from the wrapping mechanism into a mechanical appliance for trimming the tuck-end and polishing the tip or head end thereof, as provided for in my machine, this needle also serves the purpose of supporting the cigar after the wrapping mechanism has opened to permit its discharge until it is taken charge of by the trimming and finishing device, as will be hereinafter described. The needle $5^a$ is supported on downwardly curved arms $5^k$ and movably arranged in a guide 5, as best shown in Figs. 9, 14 and 15, with its point normally in line with the longitudinal center of the parts of wrapping mechanism; and it is moved into and out of a bunch arranged in said wrapping mechanism by suitable mechanical means, those which are preferred and which are illustrated in the drawing consisting of a reciprocating shuttle $5^b$, movable in guideways $5^c$ in a frame $5^d$ supported by a post $5^e$ connected to the frame 4 (Fig. 9). The needle is connected with an arm $5^f$ (Fig. 17) depending from the shuttle $5^b$ and is adjustably arranged therein by means of an adjusting screw $5^x$, whereby it may be disposed in the desired accurate relation to the wrapping mechanism and bunch to perform its intended function. The shuttle is provided with a roller $5^g$ that works in a cam-race $5^h$ (Fig. 43) in the cam-wheel A. This cam-race, as shown, is a pattern cam-race, suitably shaped to impart to the needle the precise longitudinal movements desired. At this point it is proper to remark that all of the several pattern cams and cam-races may be detached from the machine, and other cams, cam-wheels or disks with different pattern cams and races substituted therefor when it is desired to wrap bunches of different shape.

More specifically, the cam-race $5^h$ is provided with an active part which moves the needle into the bunch when the latter is delivered or inserted into the wrapping mechanism when said mechanism has been opened to receive it, as described, whereby the needle will support the bunch when the delivering device recedes and until the wrapping mechanism closes about the bunch; whereupon the needle will be withdrawn from the bunch. When the wrapping mechanism with the bunch therein arrives at the die upon which the cut-out wrapper is resting, the needle is deflected out of its hereinbefore described normal position by means of a deflector, consisting of an eye-arm $5^i$ pivoted to the support $5^j$ from the frame $5^d$ and through the eye of which the point end of the needle passes. This eye-arm is connected by a link $5^n$ with the needle guide; and said guide is hung from the before mentioned bracket-arm $5^k$ (Fig. 16) working on the shuttle $5^b$ and provided with a stud disposed in the cam-race $5^l$ (Fig. 43) in the wheel A which has an active part $5^m$ that, during each rotation of the cam-wheel,—namely, at the time the wrapping mechanism has arrived in proper position to receive the wrapper from the die, causes the needle guide to be moved outward with relation to the wrapping mechanism, and, through the medium of the link $5^n$, deflects the needle radially outward with respect to the longitudinal central line of the wrapping mechanism into the position shown in Fig. 24, so that when the needle is projected longitudinally inward it will enter beneath the wrapper, as shown in said Fig. 24, in position to lift the wrapper, and take it into the wrapping mechanism. The cam disk A is rotated by a pinion $3^v$ mounted on the shaft $3^x$ and meshing with a gear $3^u$ with which the cam disk is provided.

In order to enable the needle to enter in beneath the wrapper and afterward carry it into the wrapping mechanism without providing any intersection of the cutting edge of the die, which would be obviously objectionable, I provide that the end section $1^e$ of the perforated plate $1^b$ shall be movable and liftable to take the wrapper above the cutting edge of the die, as shown in Figs. 21 and 24. To this end the movable section of the plate is pivoted to the main part thereof, as shown at $5^o$ and I provide a passage $5^p$ in said plate into which the needle may pass so as to be certainly beneath the wrapper.

The movable section of the plate may be lifted in any suitable manner. I have illustrated one such manner in the drawing, wherein said plate is connected with a toggle-lever $5^q$, mounted on a rock-shaft $5^r$ provided with a crank-arm $5^s$, acted upon normally by a spring $5^t$ to hold the movable section $1^e$ of the plate $1^b$ within the cutting edge of the die, as shown in Fig. 21. When the wrapping mechanism approaches the die for the purpose of taking the wrapper therefrom, the crank-arm is engaged by some suitable part of the framework of the wrapping mechanism, as for example, as illustrated in Fig. 1, one of the hangers $8^a$; whereby the shaft is rocked through the medium of the toggle-lever, and the section $1^e$ is lifted to permit the entrance of the needle beneath the wrapper. After the needle has thus gone in beneath the wrapper, the needle carrier is moved in an opposite direction, and, through the mechanism heretofore described, the needle is carried into the wrapping mechanism, taking the tuck-end of the wrapper with it and disposing said tuck-end of the wrapper in contact with the bunch and holding it against the bunch during rotation thereof, or sufficiently long to insure that the wrapping mechanism has gotten the wrapper completely within its control; after which the needle is withdrawn longitudinally from the wrapping mechanism by means of a suitably shaped portion of the cam-race $5^h$ in the wheel A. As the needle is being drawn out it is restored to its normal position in alinement with the longitudinal center of the bunch by the movement of the guide 5 toward the wrapping rolls. The wrapping mechanism does not cease its movement across the wrapper supporting means, but the moment the needle has brought the tuck end of the wrapper in contact with the bunch in the wrapping mechanism, or when the wrapper has been brought into operative engagement with the bunch, the needle is withdrawn while the wrapping mechanism is performing its function, or, in other words, the operation of the wrapping mechanism does not cease during the withdrawal of the needle. After the wrapper has been applied to the bunch, the cigar is carried to the predetermined point of discharge and released.

I prefer that the cigar shall be discharged from the wrapping mechanism to mechanical appliances for trimming the tuck-end and polishing the tip or head end thereof, and have provided means whereby this is efficiently accomplished. The relative position of the trimming and polishing devices in the organism of the machine is illustrated at 11 in Fig. 2 of the drawings and the preferred construction, arrangement and mode of operation thereof are illustrated in detail in Figs. 33 to 40.

The receiver or holder $11^a$ is composed of a pair of jaws pivoted together and connected to a lazy-tong $11^b$, with which is combined a spring piston $11^c$, said piston working in a reversing box $11^d$ journaled on a stud $11^e$ having bearing in a suitable part of the machine frame. The spring $11^f$ of said piston abuts at one end against a collar $11^g$ and at the other end bears against a wall of the box lid, see Figs. 37 and 38. The holder or receiver $11^a$ is supported from said box by an arm $11^h$. The stud $11^e$ is provided with a gear wheel $11^j$ which meshes with a segment $11^k$ on a rocking arm $11^m$ fulcrumed intermediate its ends and provided with a stud $11^n$ working in the cam-race $11^o$ in a cam disk or wheel $11^p$ mounted on a shaft $11^t$ driven by means of gearing $11^u$, $11^v$ from the shaft $12^h$ (see Figs. 33 and 34), which cam-race is of suitable shape or pattern to impart to the reversing box and the holder or receiver carried thereby the movements hereinafter explained. The lazy-tong $11^b$ is eccentrically connected by means of a link $11^q$ with a disk $11^r$ mounted on a pin $11^s$ in the reversing box, whereby, when the stud shaft is rotated by the segment $11^k$ in mesh with the gear $11^j$, the jaws of the holder or receiver will be opened through the medium of the disk $11^r$ and link $11^q$. The initial position of the holder or receiver is illustrated in full lines in Fig. 33. During the rotation of the cam wheel or disk $11^p$, the holder or receiver will be projected into the wrapping mechanism, as shown in Fig. 39; and at the same time, by means of the link $11^q$ and disk $11^r$, the jaws will be opened and receive the wrapped cigar. After the wrapping mechanism is opened to permit this operation, and before the cigar is taken charge of by the holder or receiver, it will be supported by means of the needle $5^a$, which at this time will be inserted into the bunch in the manner hereinbefore explained. When the holder or receiver has taken the wrapped cigar between its jaws, the needle will be withdrawn, as explained. The configuration of the cam-race $11^o$ will now withdraw the holder and the wrapped cigar therein from the wrapping mechanism to initial position, the movement just described being indicated by the double-headed arrow in Fig. 39. When the holder or receiver has thus moved to initial position, the butt-end of the cigar will be between the blades 12 of a trimmer, which blades are pivotally connected and combined with a lazy-tong $12^b$. This device is operated in a manner similar to the cutting blades 7; that is to say, the lazy-tong $12^b$ is connected by a link $12^c$ to one arm of a double arm crank $12^d$ loosely mounted on an axle $12^e$ supported from the rack in which the cam shaft $12^h$ is mounted. The other arm of the crank $12^d$ works against a peripheral cam $12^g$ mounted on a periodically rotated shaft $12^h$, which shaft is rotated in the manner hereinafter described. Once during each rotation of the shaft $12^h$ the cam $12^g$, acting through the crank arm and link described, will cause the blades of the trimmer to perform their cutting operation, after which the jaws will be closed by the spring piston $12^k$, connected with the lazy-tong, which piston moves in guides 12$^l$ projecting from the shaft support 12$^m$. The spring 12$^n$ of this piston bears at one end against one of the guides, and at the other end against a collar fixedly secured to the piston. When the lazy-tong is actuated by the cam 12$^g$ to open the blades, this spring is compressed; and when the arm of the crank rides off the active face of the cam the spring expands and closes the blades of the trimmer. While the cigar is in the position described and being trimmed, the tip thereof is polished by a polisher 13, best shown in Fig. 36. This polisher may be of any suitable type, and shaped to fit about the tip end of the cigar. The polisher is rotated by suitable appliances, such as belt or cord and pulley arrangement 13$^a$, driven by the shaft 12$^h$. It is moved to fit over the tip end of the cigar and withdrawn therefrom after it has performed its function by means of a face-cam 13$^e$ on the shaft 12$^h$. A lever 13$^h$, one end of which is connected to the spindle 13$^f$ of the polisher, works at its other end against said cam. A spring 13$^g$ serves to maintain the polisher retracted to permit the cigar to pass into the space between the trimmer and polisher and to pass out of such space. The polisher is caused to move to and fit about the tip end of the cigar once during each rotation of the shaft 12$^g$ by the active part of the cam 13$^e$, during which time it is rotated in the manner described and performs its finishing or polishing operation.

When the trimming and finishing operation has been completed, the holder with the cigar therein is caused to discharge the cigar. In this operation the cam-race 11$^o$, by its configuration, imparts full swing to the segment arm 11$^m$, which, through the medium of the gear 11$^g$, swings the reversing box and the holder carried thereby from the position illustrated in full lines in Fig. 33, where the trimming and polishing action took place, to a place of discharge, the holder or receiver moving in the arc of a circle, as indicated by the dotted lines in Figs. 33 and 40. When the holder has assumed the full-line position at the right of Fig. 40,—the place of discharge, the jaws of the holder point downward and are caused to be opened to permit the cigar to pass therefrom, if desired, into a receptacle 14, the cigar passing through an opening in the table into the receptacle.

The jaws of the receptacle are normally held closed by means of the spring piston 11$^c$. When said holder or receiver moves up to take a cigar from the wrapping mechanism, the jaws are opened by means of a finger 15 arranged to engage teeth 15$^a$ of the disk 11$^r$ and rotate the same in a direction opposite the movement of the reversing box; consequently, the link acts to push upon the lazy-tong 11$^b$ and open the jaws, as shown in Fig. 39. As the holder moves back with the cigar to be trimmed, the spring piston 11$^c$ closes the jaws. When the holder swings over, as described, to discharge the cigar, it is desired that the jaws of the holder shall maintain control of the cigar until the discharge point has been reached, when they are to be opened to allow the cigar to pass therefrom. To accomplish this, when the holder starts upon its movement to discharge the cigar, the finger 15 is moved out of the path of the disk by means of a cam-race 15$^a$ in the cam disk or wheel 11$^p$, in which a stud 15$^b$ connected with the finger, works. When the holder has arrived at discharge point, the jaws are opened by means of the cam-race acting upon the stud 15$^b$ which restores the finger to operative position, where it will engage and rotate the cam disk. The jaws will be opened in the manner set forth in describing that operation at the time the holder takes a cigar from the wrapping mechanism.

I prefer to employ, and in the illustrated machine embodying my invention have provided, means for supplying paste to the tip end of the wrapper during the wrapping process. This pasting arrangement is best shown in Figs. 9 and 10, wherein the paste receptacle is designated by the numeral 16 and is mounted on the frame 4. It is provided with a discharge pipe 16$^a$ leading to that end of the wrapping mechanism in which the tip end of the cigar bunch and wrapper are disposed to supply a regulated or measured quantity of paste thereto. Within the receptacle 16 is arranged a piston 16$^c$ carried by a cross-head 16$^b$ connected by an eccentric pitman 16$^e$ to a gear 16$^f$ journaled on a stud 16$^g$ projecting from the wall of the receptacle and adapted to mesh with a segment gear 16$^h$ (Fig. 42) carried by the cam A. Detachably connected to the piston is a cylinder 16$^m$, within which the piston works and which cylinder partakes of part of the movement of the piston. As shown, it is connected by means of a spring latch 16$^l$ pivoted to a bracket 16$^j$ secured to the piston. A spring 16$^k$, under compression, is interposed between the bracket and the cylinder. The operation of the device thus described is as follows: During each rotation of the cam wheel or disk A, and at the proper time during such rotation, the gear 16$^f$ is rotated by the segment gear 16$^h$, and through the medium of the pitman 16$^e$ the piston and cylinder are caused to descend in the receptacle until the tail-end of the latch 16$^l$ comes into contact with the trigger 16$^o$; whereupon the cylinder is released from the piston and, under the action of the compressed spring 16$^k$, is forced quickly to cover a valve seat 16$^n$ at the bottom of the receptacle, leaving a measured quantity of paste within the cylinder and cut off from the body of paste in the receptacle. The piston continues its active stroke and forces this measured quantity of paste that passes out through the discharge passage through the valve seat $16^n$, through the pipe, to the point of application. In this discharging stroke of the piston, the spring $16^k$ is again compressed and the latch is carried down to and automatically engages the cylinder so that on the return stroke of the pitman $16^e$ the piston and cylinder move as a unit. On this return stroke the tail-end of the latch throws the trigger $16^o$, which is pivoted to the wall of the receptacle, out of the way and after the passage of the latch the trigger is returned to operative position by a spring connected therewith. I provide for regulating the quantity of paste discharged, by adjustability of the piston. In the example of device shown in the drawing, this is accomplished by providing a piston head $16^p$ having a stem $16^q$ passing through the piston proper and having a screw-threaded engagement with the cross-head $16^b$, whereby the head may be adjusted with relation to the body of the piston and provide a greater or lesser paste chamber in the cylinder.

I have, as initially explained, hereinabove described the machine as a single machine. In the drawing I have illustrated the machine as a multiple one,—that is to say, one in which there are embodied a plurality of wrapper cutting dies, a plurality of sets of wrapping mechanism, a plurality of bunch deliverers, a plurality of bunch receivers to receive the bunches from the rollers after they have been wrapped into a cigar, and a plurality of coördinate mechanisms. When arranged for operation, as shown in the drawings, as a duplex machine, the several elements combining to the duplexity I intend shall be driven from a common source of power; and to this end, as illustrated in Fig. 41 of the drawing, the cam wheel or disk $8^k$ is provided with a peripheral gear 17 that meshes with a gear $17^a$ on a shaft $17^b$ which is provided with pinions $17^c$ that in turn mesh with pinions $17^d$ on the shafts $6^h$ that carry the cams which operate the bunch deliverer and bunch trimming mechanisms; and with a peripheral gear $17^e$ that meshes with a gear $17^f$ arranged upon a sleeve $17^g$ surrounding the shaft $17^b$; upon which sleeve are mounted pinions $17^h$, one of which meshes with a gear $17^i$ on a counter-shaft $17^j$, which has connection by gear $17^k$ with another shaft $12^h$ carrying the cams and other mechanisms by which the cigar-butt trimmer and tip-finisher and cigar receiver and holder mechanisms are actuated, the other of which pinions is in mesh with a gear $17^l$ on the shaft on which the duplicate cigar trimming, finishing and receiving devices are mounted. In the duplex machine it will be understood that there will be two arms carrying the rollers that coöperate with the wrapper cutting die, and two sets of wrapping mechanisms and associated mechanism which has been fully described hereinbefore with respect to one of such sets of rollers.

The wrapper applying mechanism, as disclosed, is only one practical embodiment of the invention, and it is intended to use any other mechanism having an analogous operation, or any mechanism movable across a die or a wrapper support and constituting a bunch conveying and supporting and a wrapper applying mechanism having a traveling or traversing movement as specified.

By mere modification of driving mechanisms and augmentation of elements, the machine can, within the ordinary skill of a mechanic, be organized to take care of and wrap three or more bunches in one cycle of operation.

The operation of the machine may be started or stopped in any suitable manner, according to the preferred arrangement for this purpose illustrated in the drawings. The main driving shaft is provided with a clutch 18 adapted to be brought into and withdrawn from engagement with the band-pulley loosely arranged on said shaft. This clutch, as shown, consists of arms $18^a$ adapted to engage a friction rim $18^b$ on said pulley, said arms being pivotally connected to a sleeve $18^c$ fixedly secured to said shaft and the tail-ends of which work against a cone $18^d$ movably mounted on said shaft; with which cone is combined a shifting lever $18^e$ (in a duplex machine two shifting levers) connected with treadles so that the operator, upon depression of the treadles, may, by projecting or withdrawing the cone, throw the arms into engagement with the friction rim of the pulley or permit said arms to be released from engagement with said rim by means of springs associated therewith, as will be obvious.

Having thus described my invention, what I claim is:

1. In a cigar making machine, the combination of a fixed wrapper support, a bunch supplying means, and bunch supporting and wrapper applying mechanism having a free traveling movement to receive the bunch from said means and roll the bunch into the wrapper.

2. In a cigar making machine, the combination of a fixed wrapper support, a bunch supplying means, and wrapping and bunch supporting mechanism comprising a cluster of rotatable rolls having a free traveling movement to receive a bunch from said means and roll the wrapper.

3. In a cigar making machine, the combination with fixed wrapper cutting mechanisms for holding a wrapper at the point at which it is cut, of traveling bunch supporting and wrapping mechanism adapted to move over and progressively take the wrapper from the cutting mechanism and apply it to a bunch.

4. In a cigar making machine, the combination with a fixed cutting die, means coöperating therewith to cut a wrapper, and traveling bunch supporting and wrapping mechanism arranged to take the wrapper from the die and apply it to a bunch.

5. In a cigar making machine, the combination with a die and means coöperating therewith to cut a wrapper, of traveling wrapping mechanism, and means for causing said wrapping mechanism to move across the die and progressively remove the wrapper from the die and simultaneously apply it to a bunch.

6. In a cigar making machine, the combination with wrapper cutting mechanisms, of traveling bunch carrying and wrapper applying mechanism comprising a series of movable wrapper applying devices, and means for taking the wrapper directly from the cutting mechanism and placing it within the control of said devices while the said means moves over the wrapper cutting mechanism.

7. In a cigar making machine, the combination with mechanism on which a wrapper is cut, of traveling wrapper applying mechanism comprising a cluster of rotatable rollers movable over the said mechanism on which the wrapper is cut, and a tucking needle for placing the wrapper within the control of said rollers.

8. In a cigar making machine, the combination with dies having cutting edges, of a pair of mechanically operated arms carrying rollers adapted to coöperate with said dies to simultaneously cut wrappers, said rollers being arranged in a plurality of sets, each set comprising a plurality of rollers, -the rollers of one set sustaining a lapped or staggered relation to the rollers of the other set so that the spaces between the inner opposing ends of the rollers are out of alinement.

9. In a cigar making machine, the combination with fixed mechanism on which a wrapper is cut, of swinging wrapper applying and bunch supporting mechanism movable across and away from the said mechanism on which the wrapper is cut and traveling wrapper cutting means coöperating with said fixed mechanism.

10. In a cigar making machine, the combination with wrapper cutting mechanism including a fixed cutting die for supporting a wrapper, swinging wrapper applying and bunch supporting mechanism, means for causing said wrapper applying and bunch supporting mechanism to move across the die and progressively feed the wrapper from the latter to the bunch, and means for varying the angular relation of the wrapper applying and bunch supporting mechanism in its transit thereacross.

11. In a cigar making machine, the combination with wrapper cutting mechanism including a fixed cutting die for supporting a wrapper, of wrapper applying mechanism, and means for causing the wrapper applying mechanism to move across the die in coöperative relation thereto and assume different angular relations with reference thereto and with a variable speed.

12. In a cigar making machine, the combination with wrapper cutting mechanism including a fixed cutting die, of wrapper applying mechanism movably mounted for causing the wrapper applying mechanism to pass across the die longitudinally thereof, and means for causing said wrapper applying mechanism to move transversely across the die.

13. In a cigar making machine, the combination with wrapper cutting mechanism including a fixed cutting die, of wrapper applying mechanism movably mounted for causing the wrapper applying mechanism to pass across the die longitudinally thereof, means for causing the wrapper applying mechanism to move transversely across the die, and means for varying the speed of travel of the wrapper applying mechanism.

14. In a cigar making machine, the combination with a wrapper support, of traveling wrapper applying mechanism movably mounted for causing said wrapper applying mechanism to pass the wrapper support in coöperative relation thereto to take the wrapper therefrom and apply it to a bunch, and means for rocking or tilting the wrapper applying mechanism with relation to the support.

15. In a cigar making machine, the combination with wrapper cutting mechanism including a cutting die, means for causing said wrapper applying mechanism to pass the die in coöperative relation thereto, to take the wrapper therefrom and apply it to a bunch, and means for rocking or tilting the wrapper applying mechanism with relation to the die.

16. In a cigar making machine, the combination with a fixed wrapper holding means, of a wrapper applying mechanism movable over and having a traveling tiltable operation in relation to said means.

17. In a cigar making machine, the combination with wrapper cutting mechanism including a fixed wrapper support, wrapper applying mechanism having a swinging and traveling movement for causing said wrapper applying mechanism to pass across the wrapper support, and means for varying the angular relation of the wrapper applying mechanism in its transit across the support.

18. In a cigar making machine, the combination with wrapper cutting mechanism including a fixed wrapper support, of wrapper applying mechanism, and means for causing the wrapper applying mechanism to move across the wrapper support in coöperative relation thereto and assume different angular relations with reference thereto and have a variable speed of travel to modify the feed of the wrapper to the bunch.

19. In a cigar making machine, the combination with wrapper cutting mechanism including a fixed wrapper support, of wrapper applying mechanism having a traveling movement for causing the wrapper applying mechanism to pass across the wrapper support longitudinally thereof, and means for causing said wrapper applying mechanism to move transversely across the wrapper support.

20. In a cigar making machine, the combination with wrapper cutting mechanism including a fixed wrapper support, of wrapper applying mechanism having a traveling movement for causing the wrapper applying mechanism to pass across the wrapper support longitudinally thereof, means for causing the wrapper applying mechanism to move transversely across the wrapper support, and means for varying the speed of travel of the wrapper applying mechanism to modify the feed of the wrapper to the bunch.

21. In a cigar making machine, the combination with a fixed wrapper support, of a wrapper applying mechanism having a traveling movement across the support to take the wrapper therefrom and apply it to a bunch, and means for rocking or tilting said wrapper applying mechanism.

22. In a cigar making machine, the combination with a wrapper support, of wrapper applying mechanism having a traveling movement for causing the wrapper applying mechanism to move across the support and take the wrapper therefrom and apply it to a bunch, means for varying the coöperative angular inter-relation between said support and wrapper applying mechanism, and means for rocking or tilting the wrapper applying mechanism.

23. In a cigar making machine, the combination with a wrapper support, of wrapper applying mechanism having a traveling movement for causing the wrapper applying mechanism to pass across the support and take the wrapper therefrom and apply it to a bunch, means for varying the coöperative angular inter-relation between said support and wrapper applying mechanism, means for rocking or tilting the wrapper applying mechanism, and means for varying the speed of travel of the wrapper applying mechanism during the operation of wrapping the bunch.

24. In a cigar making machine, the combination with a wrapper support, of traveling wrapper applying mechanism, means for varying the coöperative angular inter-relation between said support and the wrapper applying mechanism, and means for rocking or tilting the wrapper applying mechanism.

25. In a cigar making machine, the combination with a wrapper support, of wrapper applying mechanism having a traveling movement for causing the wrapper applying mechanism to pass across the wrapper support longitudinally and transversely thereof, means for varying the coöperative angular inter-relation between said support and wrapper applying mechanism, means for rocking or tilting the wrapper applying mechanism, and means for varying the speed of travel of the wrapper applying mechanism during the operation of wrapping a bunch.

26. In a cigar making machine, the combination with wrapper cutting mechanism including a fixed cutting die, of wrapper applying mechanism having a traveling movement across the die longitudinally and transversely of the latter, means for varying the coöperative angular inter-relation between said die and wrapper applying mechanism, and means for varying the speed of travel of the wrapper applying mechanism during the operation of wrapping a bunch.

27. In a cigar making machine, the combination with a fixed wrapper supporting means, of a bodily swinging wrapper applying mechanism having means for causing the same to travel over said supporting means and for varying its speed of movement.

28. In a cigar making machine the combination with a fixed wrapper supporting means, of a wrapper applying mechanism having a traveling movement over the supporting means at a varying speed and also having a tilting movement relatively to the supporting means.

29. In a cigar making machine, the combination with a fixed wrapper supporting means, of a wrapper applying mechanism for carrying a bunch and having a traveling movement over the supporting means, and a shaft perpendicular to the path of travel of the wrapper applying mechanism and on which the latter is rotatably mounted.

30. In a cigar making machine, the combination with a fixed wrapper supporting means, of a wrapper applying mechanism having a traveling and tiltable movement imparted thereto, the said mechanism being movable and a shaft perpendicular to the path of travel of the said mechanism and on which the latter is rotatably mounted.

31. In a cigar making machine, the combination with a fixed wrapper supporting means and a bunch holding means, of a wrapper applying mechanism movable from one means to the other and movable over both means and having a variable speed and tilting operation imparted thereto moving over the wrapper supporting means, and a shaft perpendicular to the path of travel of the wrapper applying mechanism and on which the latter is rotatable.

32. In a cigar machine, the combination with a wrapper supporting means, of a wrapper applying mechanism for carrying a bunch, said mechanism being tiltable and having a traveling movement and adjustable in a perpendicular direction, and a shaft perpendicular to the path of travel of said mechanism and on which the latter is rotatably mounted.

33. In a cigar making machine, the combination with a wrapper holding means and a bunch holding means, of a wrapper applying mechanism operable to receive a bunch from its holding means and convey it to the wrapper holding means, said mechanism being tiltable and rotable and having a variable speed imparted thereto.

34. In a cigar making machine, the combination with wrapper supporting means and cigar bunch holding means, of a wrapper applying mechanism adjustable in a line perpendicular to its path of travel and having a shaft perpendicular to the latter path on which it is rotatable, the wrapper applying mechanism being tiltable and also having means for varying the speed and angle thereof relatively to said supporting means.

35. In a cigar making machine, the combination with a wrapper support and bunch holding means, of traveling bunch wrapping mechanism having opening and closing elements, means for opening and disposing the elements of said wrapping mechanism to permit the insertion of a bunch thereinto from said bunch holding means, and for closing the wrapping mechanism upon the bunch, and means movably disposed in said mechanism for supporting the bunch until the wrapping mechanism closes thereupon.

36. In a cigar making machine, bunch wrapping mechanism having a swinging movement in different horizontal planes to pick up a wrapper and a bunch and comprising a needle, means for actuating said needle to support the bunch until it is within the control of the wrapping mechanism, and means for actuating said needle to tuck the wrapper.

37. In a cigar making machine the combination with a wrapper support, of a swinging wrapper applying mechanism movable over the support, means for introducing a bunch into said mechanism, and means for receiving a wrapped cigar from said mechanism, the said swinging wrapper applying mechanism being movable over the said means for introducing a bunch thereinto and receiving the wrapped cigar therefrom in succession.

38. In a cigar making machine, the combination with swinging wrapping mechanism, means for introducing a bunch thereinto, means for receiving a wrapped cigar therefrom, said swinging wrapping mechanism being movable in succession over the means for introducing a bunch thereinto and the means for receiving the wrapped cigar therefrom associated with means for trimming the tuck end of the cigar and finishing the tip end thereof over which said wrapping mechanism is also movable.

39. In a cigar making machine, the combination of a wrapper applying mechanism having a swinging movement in different horizontal planes to pick up a bunch and a wrapper and also serving as a bunch manipulating mechanism, means for introducing a bunch thereinto, means for receiving a wrapped cigar therefrom, and mechanism for operating said cigar-receiving means to discharge the cigar.

40. In a cigar making machine, the combination with a fixed wrapper support, of wrapper applying mechanism, means for causing said mechanism to have a movement made up of two components to move across the wrapper support to take a wrapper therefrom and apply it to the bunch, a shaft perpendicular to the wrapper support and on which the wrapper applying mechanism is mounted, mechanism to vary the coöperative angular relation between said wrapper applying mechanism and support, means for varying the speed of travel of the wrapper applying mechanism to regulate the feed of the wrapper, means for rocking or tilting the said mechanism, and means for moving the same to and from the support during the rocking or tilting thereof.

41. In a cigar making machine, the combination with a fixed wrapper support, of a turn-table, means for rotating said turn-table, wrapper applying mechanism connected to and depending from said turn-table and means for actuating said wrapper applying mechanism to take a wrapper from the support and applying it to a bunch while the said wrapper applying mechanism is moving.

42. In a cigar making machine, a fixed wrapper support upon which the wrapper remains during the bunch wrapping operation, a swinging wrapping mechanism serving also to carry and manipulate a bunch, and means for moving the wrapping mechanism and the bunch contained therein over the wrapper, the wrapper mechanism operating to draw the wrapper upwardly around the bunch.

43. In a cigar making machine, a fixed wrapper support upon which the wrapper remains during the bunch wrapping operation, a swinging wrapping mechanism, a header with which said wrapping mechanism also coöperates, and means for moving the wrapping mechanism and the bunch contained therein over the wrapper on the fixed support, the wrapping mechanism operating to draw the wrapper upwardly to and around the bunch.

44. In a cigar machine, swinging mechanism operating in different horizontal planes for simultaneously transferring a plurality of bunches to and inclosing them in a corresponding plurality of wrappers.

45. In a cigar machine, a plurality of fixed wrapper supports, and swinging mechanism having a traveling movement in different horizontal planes for simultaneously removing a plurality of wrappers from the supports while said wrappers are being applied to bunches and while said mechanism continues to move over the said supports.

46. In a cigar machine, unitary wrapper applying mechanisms having a traveling movement in different planes, fixed wrapper supports, bunch supplying means, and mechanism for simultaneously polishing the head ends of a plurality of cigars, the wrapper applying mechanisms successively receiving bunches and disposing the latter in wrappers on the wrapper supports, applying paste to the head or tip ends of the wrappers while the latter are applied to the bunches, cutting or trimming both ends of the plurality of cigars during a continuous movement of the said wrapper applying mechanism.

47. In a cigar machine, fixed wrapper supports and bunch supplying means combined with pendant wrapper applying mechanism having a swinging movement over said supports and means, and actuating mechanism which regulates the traveling, stopping, and elevating and lowering of the wrapper applying mechanism relatively to the supports and means and during its operation between the supports and means.

48. In a cigar machine, a wrapper support, a traveling wrapper applying mechanism movable over said support, and having movement in different horizontal planes to bring the said mechanism in coöperative relation with a wrapper on the support while the wrapper is being applied to a bunch and also to clear said mechanism from the support.

49. In a cigar machine, the combination with wrapper cutting device, of traveling bunch supporting and wrapping mechanism movable over said device and adapted to apply a wrapper from the cutting mechanism directly to a bunch by an upward drawing action on the wrapper exerted by the said mechanism.

50. In a cigar machine, the combination with a fixed wrapper support and bunch supplying means, of traveling wrapper applying mechanism comprising bunch shaping and tucking means connected therewith and movable over the support and bunch supplying means.

51. In a cigar machine, the combination with a fixed wrapper support and bunch supplying means, of traveling wrapper applying, bunch supporting and shaping mechanism, provided with means for inserting the tuck end of a wrapper therein and movable over the wrapper support and bunch supplying means.

52. In a cigar making machine, the combination with a wrapper support, of a traveling organization having a circuitous movement in different horizontal planes and constituting a bunch carrying, manipulating and wrapping mechanism coöperating with the said support, means for introducing a bunch into said mechanism, and means for receiving a wrapped cigar therefrom.

53. In a cigar making machine, the combination of traveling organization having a circuitous movement in different horizontal planes and constituting a bunch carrying, manipulating and wrapping mechanism, means for introducing a bunch thereinto, means for receiving a wrapped cigar from said mechanism, associated with means for trimming the tuck end of the cigar and finishing the tip end thereof.

54. The combination with a swinging wrapping mechanism adapted to carry a bunch, of a wrapper support beneath the wrapping mechanism and over which the latter moves in different horizontal planes, means for producing relative movements between the wrapping mechanism and the support and for raising a portion of the wrapper to said mechanism to cause the wrapper to be properly wound upon the bunch.

55. The combination with a wrapping mechanism adapted to carry a bunch, of a suction wrapper support beneath the wrapping mechanism, means for producing relative movements between the wrapping mechanism and the support and for relieving the latter of suction and also for elevating a portion of the wrapper to said mechanism to cause the wrapper to be properly wound upon the bunch.

In testimony whereof I have hereunto set my hand in presence of two subscribing witnesses.

JOSEPH D. LACROIX.

Witnesses:
 GEO. B. CLARK,
 FRANCIS P. DEVINE.